US012241595B1

(12) United States Patent
Chen et al.

(10) Patent No.: US 12,241,595 B1
(45) Date of Patent: Mar. 4, 2025

(54) LNG GAS SUPPLY SYSTEMS FOR SHIPS

(71) Applicant: HEFEI GENERAL MACHINERY RESEARCH INSTITUTE CO., LTD., Anhui (CN)

(72) Inventors: Yongdong Chen, Hefei (CN); Bingchuan Han, Hefei (CN); Gaige Yu, Hefei (CN); Hongwei Zou, Hefei (CN); Xiaogen Liu, Hefei (CN); Jing Deng, Hefei (CN)

(73) Assignee: HEFEI GENERAL MACHINERY RESEARCH INSTITUTE CO., LTD., Hefei (CN)

( * ) Notice: Subject to any disclaimer, the term of this patent is extended or adjusted under 35 U.S.C. 154(b) by 0 days.

(21) Appl. No.: 18/651,663

(22) Filed: Apr. 30, 2024

Related U.S. Application Data

(63) Continuation-in-part of application No. PCT/CN2024/070248, filed on Jan. 3, 2024.

(30) Foreign Application Priority Data

Sep. 5, 2023 (CN) ......................... 202311132936.5

(51) Int. Cl.
*F17C 7/04* (2006.01)

(52) U.S. Cl.
CPC ........ *F17C 7/04* (2013.01); *F17C 2205/0323* (2013.01); *F17C 2205/0352* (2013.01);
(Continued)

(58) Field of Classification Search
CPC ..................................... F17C 9/02; F17C 9/04
(Continued)

(56) References Cited

U.S. PATENT DOCUMENTS

2021/0270536 A1 9/2021 Suzuki et al.
2024/0159360 A1* 5/2024 Wilkinson ................ B63J 2/14

FOREIGN PATENT DOCUMENTS

CN 1766403 A 5/2006
CN 102135051 A 7/2011
(Continued)

OTHER PUBLICATIONS

First Office Action in Chinese Application No. 202311132936.5 mailed on Oct. 16, 2023, 18 pages.
(Continued)

*Primary Examiner* — John F Pettitt, III
(74) *Attorney, Agent, or Firm* — PORUS IP LLC

(57) ABSTRACT

An LNG gas supply system for a ship is provided, comprising an LNG storage tank, wherein: the LNG storage tank is connected with a BOG pipeline for outputting evaporated gas of natural gas, a low-pressure LNG treatment pipeline, a high-pressure LNG treatment pipeline and an ethylene glycol-water heating pipeline, wherein: the BOG pipeline includes a first regulating valve and a first-stage compressor unit arranged sequentially along a gas flow direction; the low-pressure LNG treatment pipeline includes a second regulating valve, a first cold source of a multi-stream vaporizer, and a separator arranged sequentially along the gas flow direction; the high-pressure LNG treatment pipeline includes a third regulating valve, a high-pressure booster pump and a second cold source of the multi-stream vaporizer arranged sequentially along the gas flow direction; and the ethylene glycol-water heating pipeline includes a medium storage tank for storing ethylene glycol water.

11 Claims, 12 Drawing Sheets

100

(52) U.S. Cl.
CPC .................. *F17C 2221/033* (2013.01); *F17C 2223/0161* (2013.01); *F17C 2227/0157* (2013.01); *F17C 2227/0309* (2013.01); *F17C 2270/0105* (2013.01)

(58) Field of Classification Search
USPC .......................................................... 62/50.2
See application file for complete search history.

(56) References Cited

FOREIGN PATENT DOCUMENTS

| | | | | |
|---|---|---|---|---|
| CN | 204060975 | U | * | 12/2014 |
| CN | 105102800 | A | | 11/2015 |
| CN | 105324302 | A | | 2/2016 |
| CN | 105569881 | A | | 5/2016 |
| CN | 109184837 | A | | 1/2019 |
| CN | 109185693 | A | * | 1/2019 |
| JP | 2010023776 | A | | 2/2010 |
| KR | 101303619 | B1 | | 9/2013 |
| KR | 101480255 | B1 | * | 12/2014 |
| KR | 20140143023 | A | * | 12/2014 |
| KR | 20150115126 | A | | 10/2015 |
| KR | 20160144888 | A | * | 12/2015 |
| KR | 102155991 | B1 | | 9/2020 |
| KR | 20220147768 | A | * | 4/2021 |
| KR | 102299710 | B1 | | 9/2021 |
| KR | 20220033067 | A | * | 3/2022 |
| KR | 20220044228 | A | | 4/2022 |
| KR | 20220135004 | A | * | 10/2022 |
| WO | 2019188676 | A1 | | 10/2019 |

OTHER PUBLICATIONS

Notification to Grant Patent Right for Invention in Chinese Application No. 202311132936.5 mailed on Oct. 25, 2023, 5 pages.

* cited by examiner

100

LNG GAS SUPPLY SYSTEMS FOR SHIPS

CROSS-REFERENCE TO RELATED APPLICATIONS

This application is a Continuation-in-part Application of International Application No. PCT/CN2024/070248, filed on Jan. 3, 2024, which claims priority to Chinese Patent Application No. 202311132936.5, filed on Sep. 5, 2023, the entire contents of each of which are hereby incorporated by reference.

TECHNICAL FIELD

The present disclosure relates to the technical field of fuel vaporization in ship construction and ship design, and specifically relates to an LNG gas supply system for a ship.

BACKGROUND

For ships powered by liquefied natural gas (LNG), the LNG as natural gas fuel is good for storage and transportation. However, the LNG needs to be pressurized, vaporized, and heated and then used to power the main engine and auxiliary engines. The current LNG ship main engine gas supply system mainly consists of a high-pressure unit, a low-pressure unit, and an ethylene glycol-water heating pipeline. The high-pressure unit and the low-pressure unit contain a corresponding compressed gas processing module, a low-pressure treatment pipeline, and a high-pressure treatment pipeline. The low-pressure treatment pipeline and the high-pressure treatment pipeline in turn consist of a high number of high-pressure vaporizers or low-pressure vaporizers.

The above traditional LNG gas supply system has the following problems: Firstly, LNG fuel is stored in tanks normally in a liquid state, but natural gas evaporation gas, also known as Boil Off Gas (BOG), is inevitable to form. If the BOG is not handled well, it may put the safety of the equipment operation to a severe test. Secondly, since a temperature of low-temperature LNG is −162° C., while a freezing point of ethylene glycol-water is usually around −40° C., that is, the temperature of the low-temperature LNG is much lower than the freezing point of the ethylene glycol-water, therefore, in many vaporizers, the ethylene glycol-water side is very easy to freeze. Once a heat exchange flow channel on the ethylene glycol-water side is partially iced up, the heat exchange flow channel may be blocked for heat exchanging and circulating, and then a rate of freezing may be gradually accelerated, and ultimately, there may be a complete freezing on the ethylene glycol-water flow channel inside the vaporizer, leading to the failure of a vaporization function and affecting a normal operation of the system.

A common solution strategy in the industry for the above problem is to equip each vaporizer with an additional set of parallel vaporization systems. Either an outlet temperature of the corresponding LNG side is significantly lower than a design temperature or a resistance drop of the ethylene glycol-water side is significantly increased, it may be determined that freezing is occurring inside a hot side of the corresponding vaporizer. In such a case, a valve may be switched to activate another set of vaporization system on standby, ensuring a continuous operation of the equipment without downtime.

However, the above way of switching the vaporization system still has the following problems: on one hand, the additional vaporization system occupies more floor space, and at the same time, the weight of the whole set of equipment, and the cost of production and operation and maintenance costs are significantly increased. On the other hand, the freezing judgment and switching process of the vaporization system is still mostly manually-assisted, requiring a high level of operator experience and technical thresholds. The operation and control logic of the computerized control section may also become more complex, making it difficult to meet the current development needs of the industry, which are becoming more and more concise, efficient, and cost-effective.

Therefore, it is desired to provide a ship gas supply system that may achieve lightweighting of the equipment and efficient use of LNG fuel while enhancing safety, reducing cost and facilitating optimized control logic.

SUMMARY

One or more embodiments of the present disclosure provide an LNG gas supply system for a ship. The system comprises an LNG storage tank; wherein: the LNG storage tank is connected with a BOG pipeline for outputting evaporated gas of natural gas, a low-pressure LNG treatment pipeline, a high-pressure LNG treatment pipeline and an ethylene glycol-water heating pipeline, wherein: the BOG pipeline includes a first regulating valve and a first-stage compressor unit arranged sequentially along a gas flow direction, an outlet of the first-stage compressor unit being provided with a first branch pipeline and a second branch pipeline, the first branch pipeline being connected with a high-pressure host via a second-stage compressor unit, and the second branch pipeline being connected with a first heater and a generator set sequentially via a fifth regulating valve; the low-pressure LNG treatment pipeline includes a second regulating valve, a first cold source of a multi-stream vaporizer, and a separator arranged sequentially along the gas flow direction, and the separator being connected with the generator set via the first heater; the high-pressure LNG treatment pipeline includes a third regulating valve, a high-pressure booster pump and a second cold source of the multi-stream vaporizer arranged sequentially along the gas flow direction, and the second cold source being connected with the high-pressure host; and the ethylene glycol-water heating pipeline includes a medium storage tank for storing ethylene glycol water, the ethylene glycol water being discharged from the medium storage tank and then returning to the medium storage tank after sequentially passing through a low-pressure booster pump, a heat source of the multi-stream vaporizer, a fourth regulating valve and a second heater;

the multi-stream vaporizer includes a pipe box and a core with a built-in flow channel, the flow channel including a low-pressure LNG flow channel constituting the first cold source, a heat exchange medium flow channel constituting the heat source, and a high-pressure LNG flow channel constituting the second cold source; the heat exchange medium flow channel is a sequential stacked structure including a first main flow channel, a first auxiliary flow channel, a second auxiliary flow channel and a second main flow channel, the first main flow channel and the first auxiliary flow channel being connected to each other to form an upper heat source cavity, and the second main flow channel and the second auxiliary flow channel being connected to each other to form a lower heat source cavity, the second auxiliary flow channel and the first main flow channel being adjacent to each other, and the second main flow channel and the first auxiliary flow channel being adjacent to each other along a stacking direction of the heat exchange medium flow channel; in a same heat source cavity, a flow area of the main flow channel is larger than a flow area of the auxiliary flow channel, and the main flow channel and the auxiliary flow channel intersect with each other, so that an intersection forms a connection point that penetrates each other.

In some embodiments, in a projection of a top view direction, the second auxiliary flow channel is located within a projection range of the first main flow channel, and the second main flow channel is located within a projection range of the first auxiliary flow channel.

In some embodiments, the auxiliary flow channel is formed by combining two or more independent flow channels side by side; and each of the two or more independent flow channels is independently connected to a corresponding main channel in the same heat source cavity at the connection point.

In some embodiments, a bottom end of the first auxiliary flow channel and a top end of the second auxiliary flow channel intersect with each other along the stacking direction of the heat exchange flow channel, and a converging port connecting the upper heat source cavity and the lower heat source cavity is formed at the intersection.

In some embodiments, two adjacent intersection points of the main flow channel and the auxiliary flow channel in the same heat source cavity are two end points, and a section of an auxiliary flow channel between the two end points forms a single flow channel segment, and a partition plate is arranged within the single flow channel segment; and the partition plate extends along a length direction of the single flow channel segment to divide a flow channel cavity of the single flow channel segment into at least two isolation cavities; and a distance exists between two ends of the partition plate and the two end points.

In some embodiments, outer shapes of the main flow channel and outer shapes of the auxiliary flow channel are V-shaped, W-shaped or wavy, and openings of the main flow channel and the auxiliary flow channel that cooperate with each other are opposite to each other in the same heat source cavity, so that the openings of the main flow channel and the auxiliary flow channel are combined to form a closed loop structure, and the connection point is provided at a joining point of the closed loop structure.

In some embodiments, a turning point of the V-shaped or W-shaped main channel and a turning point of the V-shaped or W-shaped of the auxiliary flow channel is an inflection point of each flow channel, or a peak or a trough of the wavy main channel and a peak or a trough of the wavy the auxiliary flow channel is the inflection point of each flow channel, and then forming a row of a flow channel unit with the main flow channel and the auxiliary flow channel cooperating with each other in the same heat source cavity, adjacent inflection points of a current row flow channel unit and adjacent row flow channels of the same heat source cavity are connected to each other.

In some embodiments, the upper heat source cavity and the lower heat source cavity are formed by three of heat exchange plates, the three heat exchange plates include a first heat exchange plate, a second heat exchange plate and a third heat exchange plate; a groove-shaped first main flow channel is etched on a lower surface of the first heat exchange plate, a groove-shaped first auxiliary flow channel is etched on an upper surface of the second heat exchange plate, a groove-shaped second auxiliary flow channel is etched on a lower surface of the second heat exchange plate, and a groove-shaped second main flow channel is etched on an upper surface of the third heat exchange plate; the corresponding main flow channel and the corresponding auxiliary flow channel are notched to each other at the connection point to form a corresponding heat source cavity; and an upper heat exchange plate provided with the low-pressure LNG flow channel is arranged above the first heat exchange plate, and a lower heat exchange plate provided with the high-pressure LNG flow channel is arranged below the third heat exchange plate.

In some embodiments, the upper heat source cavity and the lower heat source cavity are formed by three of heat exchange plates, the three heat exchange plates include a first heat exchange plate, a second heat exchange plate and a third heat exchange plate; a groove-shaped first main flow channel is etched on a lower surface of the first heat exchange plate, a groove-shaped first auxiliary flow channel is etched on an upper surface of the second heat exchange plate, a groove-shaped second auxiliary flow channel is etched on a lower surface of the second heat exchange plate, and a groove-shaped second main flow channel is etched on an upper surface of the third heat exchange plate; the corresponding main flow channel and the corresponding auxiliary flow channel are notched to each other at the connection point to form a corresponding heat source cavity; and a side heat exchange plate is also arranged above or below the first heat exchange plate, and the side heat exchange plate is simultaneously provided with the low-pressure LNG flow channel and the high-pressure LNG flow channel that are independent of each other.

In some embodiments, a range of angles formed between the main flow channel or the auxiliary flow channel and a length direction of the three heat exchange plates respectively is in a range from 0° to 15°.

In some embodiments, the main flow channel is a semi-circular groove or a semi-elliptical groove with a radius between 0.5 and 2 mm, or a rectangular groove with a width between 0.5 and 2 mm.

Some embodiments of the present disclosure include at least the following beneficial effects:

The present disclosure, through the optimized arrangement of each pipeline, the control of the valves and the regulation of the pressure, may flexibly realize an efficient handling of LNG liquid fuel and BOG gaseous fuel in a gas storage tank 101. Not only does it enhance the function of effective utilization of the BOG gas and greatly improve the safety of the gas storage tank, but it may also further simplify the volume of the equipment, reduce the weight of the equipment, and the dual-cooling structure of the vaporizer, thus realizing the efficient use of the LNG fuel while reducing costs and facilitating the optimization of the control logic.

BRIEF DESCRIPTION OF THE DRAWINGS

This description will be further explained in the form of exemplary embodiments, which will be described in detail by means of accompanying drawings. These embodiments are not restrictive, in which the same numbering indicates the same structure, wherein.

DESCRIPTION OF ACCOMPANYING MARKINGS

101—gas storage tank; 102—output pipeline; 102*a*—first branch pipeline; 102*b*—second branch pipeline; 103—low—pressure treatment pipeline; 104—high-pressure treatment pipeline; 105—heating pipeline; 106—high-pressure host; 1071—first heater; 108—generator set; 1021—first-stage compressor unit; 1022—second-stage compressor unit; 109—vaporizer; 1011—separator; 1012—high-pressure booster pump; 1051—medium storage tank; 1013—low-pressure pressurized pump; 1071—second heater; 1091—low-pressure flow channel; 1092—high-pressure flow channel; 1093—heat exchange medium flow channel; 1094*a*—first main flow channel; 1094*b*—first auxiliary flow channel; 1095*a*—second main flow channel; 1095*b*—second auxiliary flow channel; 1096*a*—upper heat exchange plate; 1096*b*—first heat exchange plate; 1096*c*—second heat exchange plate; 1096*d*—third heat exchange plate; 1096*e*—lower heat exchange plate; 1097—converging port; 1098—partition plate.

DETAILED DESCRIPTION

The accompanying drawings, which are required for use in the description of the embodiments, are briefly described below. The accompanying drawings do not represent the entirety of the embodiments.

As used herein, "system," "device," "unit," and/or "module" are used as a means of distinguishing between different levels of components, elements, parts, sections, or assemblies. The words may be replaced by other expressions if other words would accomplish the same purpose.

As shown in the present disclosure and in the claims, unless the context clearly suggests an exception, the words "a," "an," "one" and/or "the" do not refer specifically to the singular and may include the plural. Generally, the terms "including" and "comprising" suggest only the inclusion of clearly identified steps and elements.

Figure 1:
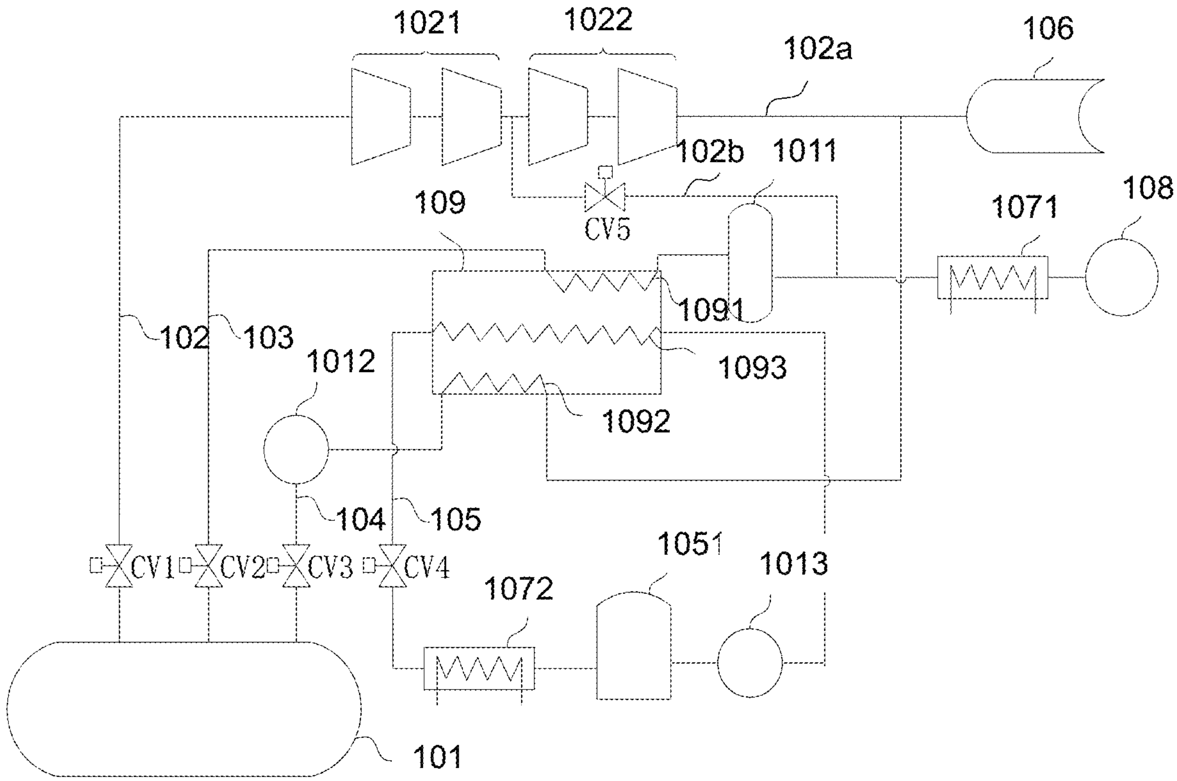
FIG. 1 is a diagram illustrating a state of a pipeline arrangement of a ship gas supply system according to some embodiments of the present disclosure.

As shown in FIG. 1, in some embodiments, the ship gas supply system 100 may include a gas storage tank 101 (also known as an LNG storage tank), the gas storage tank being connected with an output pipeline 102 (also known as a BOG pipeline) for outputting evaporated gas of natural gas, a low-pressure treatment pipeline 103 (also known as a low-pressure LNG treatment pipeline), a high-pressure treatment pipeline 104 (also known as a high-pressure LNG treatment pipeline), and a heating pipeline 105 (also known as an ethylene glycol-water heating pipeline).

The gas storage tank 101 may be used to store LNG. In some embodiments, the gas storage tank 101 stores a large amount of LNG, typically at a temperature of −162° C. and a pressure of 0.1 MPa. The cryogenic LNG may be further pressurized, vaporized, heated, and then used as a fuel to power a ship. The gas storage tank 101 may also be used to store other gases that may be used as a fuel.

In some embodiments, the gas storage tank 101 may include a variety of types such as a vertical LNG storage tank, a horizontal LNG storage tank, a vertical sub-master tank, and an atmospheric pressure storage tank. In some embodiments, the gas storage tank 101 may be connected to a variety of pipelines (e.g., the output pipeline 102, the low-pressure treatment pipeline 103, the high-pressure treatment pipeline 104, etc.) via a regulating valve to process the stored cryogenic LNG. In some embodiments, the gas storage tank 101 is externally clad with an insulation layer having good adiabatic properties, but due to a large temperature difference with the external environment, a large amount of natural gas that is evaporating, also known as BOGs, is inevitably generated inside the gas storage tank 101. In the embodiments of the present disclosure, these BOGs may pass directly along the output pipeline 102 to be outputted to the high-pressure host 106 or the generator set 108.

The output pipeline 102 may be used to output flash steam BOG of liquefied natural gas. As shown in FIG. 1, in some embodiments, the output pipeline 102 may include a first regulating valve CV1 and a first-stage compressor unit 1021 arranged sequentially along a gas flow direction, and an outlet of the first-stage compressor unit 1021 is provided with a first branch pipeline 102*a* and a second branch pipeline 102*b*, wherein the first branch pipeline 102*a* is connected to the high-pressure host 106 via a second-stage compressor unit 1022, and the second branch pipeline 102*b* is connected to a first heater 1071 and the generator set 108 in sequence via a fifth regulating valve CV5.

The first regulating valve CV1 is one of regulating valves connected to the gas storage tank 101. The regulating valves are control valves for controlling a flow, a pressure, a temperature, a level, etc. of a medium. In the present disclosure, the regulating valve may be used to control a flow of a medium in a pipeline (e.g., the output of cryogenic LNG or BOG). The first regulating valve CV1 may be used to control flow of BOG in the output pipeline 102. The fifth regulating valve CV5 may be used to control a flow of gas passing in the second branch pipeline 102*b*.

The first-stage compressor unit 1021 and the second-stage compressor unit 1022 may be used to raise a low-pressure gas to a high-pressure gas. For each stage of compressor units, a number of compressors may be included as appropriate. In some embodiments, both the first-stage compressor unit and the second-stage compressor unit include two compressors in series with each other to ensure compression efficiency. In some embodiments, the first-stage compressor unit and the second-stage compressor unit may each include at least two compressors, for example, three compressors. No limitations are placed on the number of compressors included in each compressor unit.

In some embodiments, the first-stage compressor unit 1021 may include a first-stage compressor and a second-stage compressor, and the second-stage compressor unit 1022 may include a third-stage compressor and a fourth-stage compressor. The first-stage compressor, the second-stage compressor, the third-stage compressor, and the fourth-stage compressor may be compressors with the same or different compression ratios. The compression ratio may be expressed as an absolute pressure on a high-pressure side divided by an absolute pressure on a low-pressure side. In some embodiments, the BOG may be subjected to one or more stages of pressurization to obtain a gas of a specific pressure. For example, a gas pressure that meets requirements for use of the high-pressure host 106 may be 20 MPa and above. The one-stage or multi-stage pressurized treatment may be realized by one or more of the compressors described above.

The high-pressure host 106 is a ship power unit which provides power to various types of ships. In the embodiments of the present disclosure, the ship's fuel is natural gas, and thus the high-pressure host 106 is a device that may generate power based on the natural gas. The generator set 108 is a device that provides electrical power to the ship. In the embodiments of the present disclosure, the generator set 108 may convert an energy from the natural gas into an electrical energy. The first heater 1071 may heat the passing gas (e.g., BOG) so that the heated gas may be used by the generator set 108.

In some embodiments, the BOG generated in the gas storage tank 101 may flow through the first regulating valve CV1, along the output pipeline 102, and subsequently sequentially enter the first-stage compressor unit 1021, which includes a first-stage compressor and a second-stage compressor, for an initial pressurization. A portion of the natural gas (NG) in its natural state after the initial pressurization may enter the first branch pipeline 102*a* and be further pressurized by the second-stage compressor unit 1022, which includes a three-stage compressor and a four-stage compressor, and be compressed step by step to 20 MPa or more. The NG that is pressurized to more than 20 MPa may meet the usage requirements of the high-pressure host 106, and then enters the high-pressure host 106 to power the ship. Another portion of the NG after the initial pressurization may enter the second branch pipeline 102*b*, pass through the fifth regulating valve CV5, and subsequently enter the first heater 1071 for a heating treatment. The heated, higher-temperature NG may meet the requirements for use by the generator set 108, and finally enters the generator set 108 to provide the electrical power to the ship.

The low-pressure treatment pipeline 103 may be used to treat the cryogenic LNG in a low-pressure environment. As shown in FIG. 1, in some embodiments, the low-pressure treatment pipeline 103 may include a second regulating valve CV2 arranged in sequence along the gas flow direction, a first cold source of a vaporizer 109 (also known as a multi-stream vaporizer), and a separator 1011, with the separator 1011 connected to the generator set 108 via the first heater 1071.

The second regulating valve CV2 is one of the regulating valves connected to the gas storage tank 101. The second regulating valve CV2 may be used to control a flow rate of cryogenic LNG passing through the low-pressure treatment pipeline 103.

The vaporizer 109 may be used to vaporize the cryogenic LNG liquid. In some embodiments, the vaporizer 109 may include a first cold source, a second cold source, and a heat source, the gas or liquid passing through the first cold source and/or the second cold source may absorb heat for warming, and the gas or liquid may dissipate heat to cool. In some embodiments, the vaporizer 109 may include a variety of types such as an up-suction type, a down-suction type, a flat-suction type, a single-cavity type, and a dual-cavity type. In some embodiments, the vaporizer 109 may include a pipe box and a core with built-in flow channels, and the flow channels may include a low-pressure flow channel constituting the first cold source (also known as a low-pressure LNG flow channel), a high-pressure flow channel constituting the second cold source (also known as a high-pressure LNG flow channel), and a heat exchange medium flow channel constituting a heat source. The heat source in the vaporizer 109 may provide heat to a cold source (e.g., the first cold source and the second cold source), so that the gas or liquid passing through the cold source may absorb heat to warm up. For more information about the vaporizer 109, please refer to the later related descriptions.

The separator 1011 may be used to achieve a separation of a heavy hydrocarbon from a light hydrocarbon in order to provide a high methane number gas for subsequent processes. In some embodiments, the separator 1011 may include a centrifugal separator, an electrostatic separator, and other types.

In some embodiments, the cryogenic LNG (e.g., −162° C. LNG) stored in the gas storage tank 101 may flow through the second regulating valve CV2 and subsequently flow through the first cold source of the vaporizer 109, absorbing heat from the heat exchange medium in the heating pipeline 105. At this time, the low-temperature LNG begins to absorb heat and vaporize into the natural gas (NG), which then enters the separator 1011 to separate the heavy hydrocarbon from the light hydrocarbon. The NG at a top of the separator 1011 may further enter the first heater 1071 for the heating treatment, and after being heated to a higher temperature NG, it enters the generator set 50 to provide electricity for the ship.

The high-pressure treatment pipeline 104 may be used to treat the cryogenic LNG in a high-pressure environment. In some embodiments, the high-pressure treatment pipeline 104 may include a third regulating valve CV3, a high-pressure booster pump 1012, and a second cold source of a vaporizer 109 arranged in sequence along a gas flow direction, the second cold source is connected to the high-pressure host 106.

The third regulating valve CV3 is one of the regulating valves connected to the gas storage tank 101. The third regulating valve CV3 may be used to control the flow of cryogenic LNG passing through the high-pressure treatment pipeline 103.

The high-pressure booster pump 1012 is used to pressurize the passing cryogenic LNG. Compared to the compressor unit in the output pipeline 102, the high-pressure booster pump 1012 may directly pressurize the passing cryogenic LNG to a desired pressure, e.g., 20 MPa and above, without having to go through the step-by-step pressurization.

In some embodiments, the cryogenic LNG (e.g., −162° C. LNG) stored in the gas storage tank 101 may flow through the third regulating valve CV3 and enter the high-pressure booster pump 1012 to be pressurized to 20 MPa and above, and subsequently enter the second cold source of the vaporizer 109. In the second cold source, the low-temperature, high-pressure LNG may absorb heat from the heat exchange medium within the heating pipeline 105, thereby sufficiently vaporizing into the high-pressure and high-temperature NG to meet the requirements for the high-pressure host 106, and subsequently enter the high-pressure host 106 to provide power for the ship.

The heating pipeline 105 may be used to provide heat to the vaporizer 109. In some embodiments, the heating pipeline 105 may include a medium storage tank 1051 for storing a heat exchange medium (e.g., ethylene glycol water), and the heat exchange medium is discharged from the medium storage tank 1051, and then passes through the low-pressure pressurized pump 1013 in sequence, the vaporizer 109 of the heat source, a fourth regulating valve CV4, and a second heater 1072 before returning to the medium storage tank 1051.

The medium storage tank 1051 may be used for storing the heat exchange medium. The heat exchange medium is primarily used to heat gases or liquids passing through the low-pressure treatment pipeline 103 and the high-pressure treatment pipeline 104 through a heat exchange operation. In some embodiments, the heat exchange medium may be an ethylene glycol-water or another heat exchange medium, without limitation herein. The ethylene glycol-water may be used as a carrier coolant to provide heat to the low-pressure treatment pipeline 103 and the high-pressure treatment management 104 after treatment by the heating pipeline 105.

The low-pressure pressurized pump 1013 may be used to pressurize the passed liquid or gas. The low-pressure pressurization pump 1013 pressurizes at a lower pressure than the high-pressure booster pump 1012.

The fourth regulating valve CV4 is a regulating valve located between the second heater 1072 and the heat source of the vaporizer 109. The fourth regulating valve CV4 may be used to control a flow rate of the heat exchange medium passing through the heating pipeline 105.

The second heater 1072 may heat up the passed heat exchange medium, thereby restoring the heat exchange medium to a higher temperature to be returned to the medium storage tank 1051 for recycling. The higher temperature heat exchange medium in the medium storage tank 1051 may further provide heat to the cold source of the vaporizer 109 by passing through the hot source of the vaporizer 109.

Taking the heat exchange medium as the ethylene glycol-water as an example, the ethylene glycol-water in the medium storage tank 1051 first enters the low-pressure pressurized pump 1013 for a pressurized treatment, and then flows through the heat source of the vaporizer 109, releasing heat to the high-pressure treatment pipeline 104 of the high-pressure LNG and low-pressure LNG of the low-pressure treatment pipeline 103. Then, the ethylene glycol-water passes through the fourth regulating valve CV4 and then enters into the second heater 1072 to absorb the heat, and is restored to a relatively high temperature of about 50° C. ethylene glycol-water, and finally returned to the medium storage tank 1051. In this manner, the heating pipeline 105 may continuously provide heat to the low-pressure treatment pipeline 103 and the high-pressure treatment pipeline 104.

In the embodiments of the present disclosure, the ship gas supply system 100 may be used for providing power to a high-pressure main engine and a generator set of an LNG ship. Through the optimized articulation of the individual pipelines, and the control of the valves and the regulation of the pressure, the efficient handling of the LNG liquid fuel and the BOG gaseous fuel in the gas storage tank 101 may be flexibly achieved. Not only does it enhance the function of effective utilization of the BOG gas and greatly improve the safety of the gas storage tank, but it may also further simplify the volume of the equipment, reduce the weight of the equipment, and shrink the equipment's footprint by means of the vaporizer of the dual cooling source structure, thus realizing the efficient use of the LNG fuel while reducing costs and facilitating the optimization of the control logic.

In some embodiments, the vaporizer 109 may be a multi-stream vaporizer, and at least two flow channels may be included in the multi-stream vaporizer to separately vaporize the liquid passing through the flow channels. In some embodiments, the multi-stream vaporizer may include a pipe box and a core with built-in flow channels, the flow channels including a low-pressure flow channel constituting the first cold source, a heat exchange medium flow channel constituting the heat source, and a high-pressure flow channel constituting the second cold source.

The pipe box is used to house the core, and the core is used to form the flow channel. In some embodiments, the core body may include an upper end plate and a lower end plate, with the flow channel located between the two end plates.

In some embodiments, the core includes one or more functional heat exchange structures. The functional heat exchange structures may be used to perform a heat exchange to vaporize the liquid.

Figure 8:
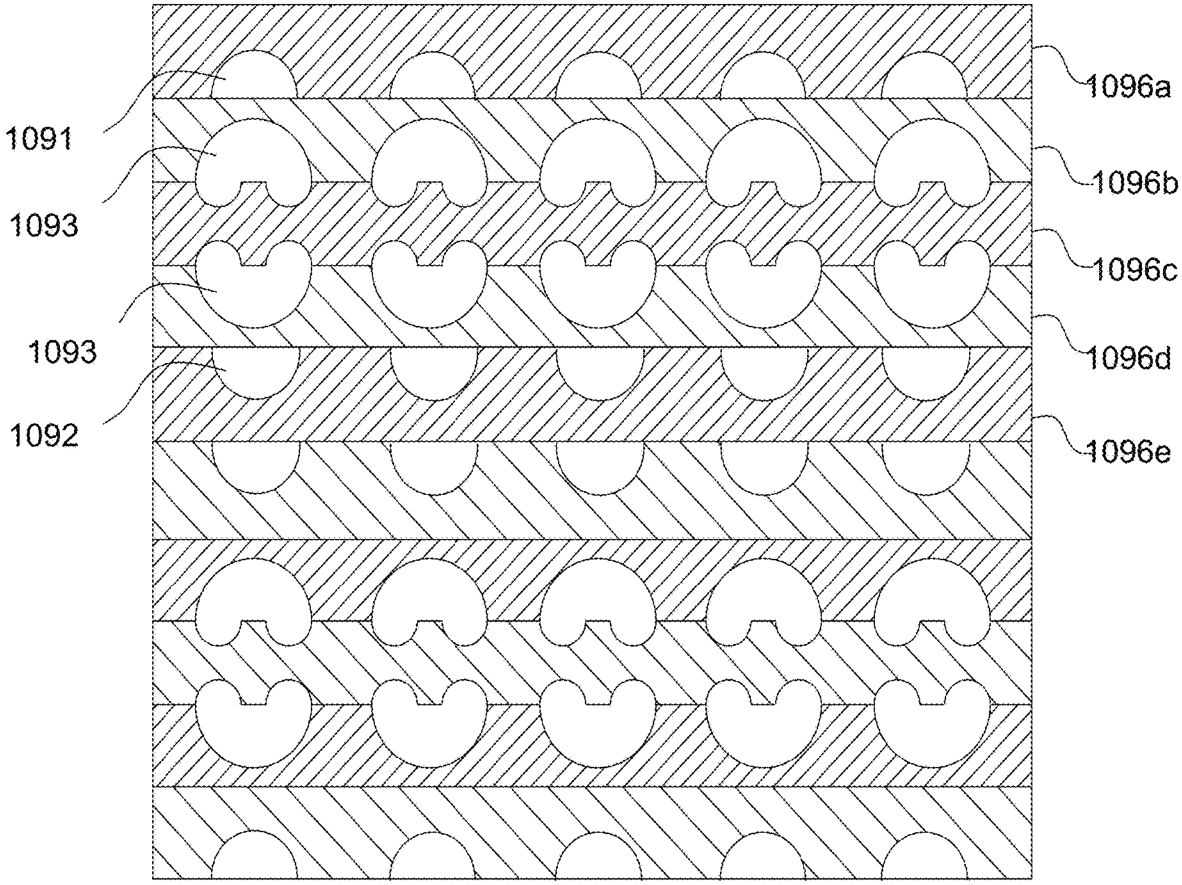
FIG. 8 is a diagram illustrating an assembled state of the structure shown in FIG. 2 according to some embodiments of the present disclosure.

As shown in FIG. 1 and FIG. 8, in some embodiments, each of the functional heat exchange structures has a low-pressure flow channel 1091, a high-pressure flow channel 1092, and a heat exchange medium flow channel 1093 built into the structure. The low-pressure flow channel 1091 and the high-pressure flow channel 1092 may constitute a cold source, while the heat exchange medium flow channel 1093 may constitute a heat source. The low-pressure flow channel 1091 may constitute the first cold source, and the high-pressure flow channel 1093 may constitute the second cold source. In practice, a number of flow channels may also be added to the multi-stream vaporizer as appropriate, e.g., the multi-stream vaporizer may include two or even more sets of flow channels.

Figure 9:
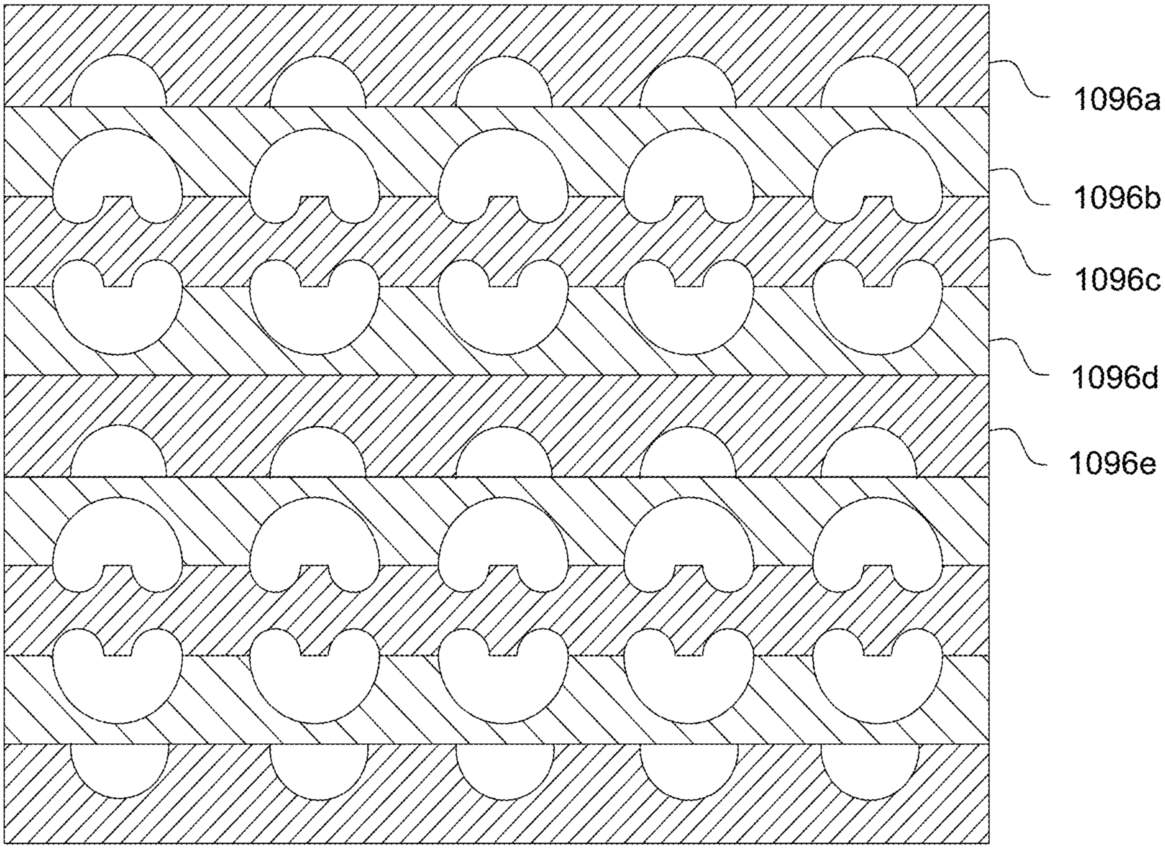
FIG. 9 is a diagram illustrating an assembled state of the structure shown in FIG. 5 according to some embodiments of the present disclosure.

In some embodiments, the functional heat exchange structure may consist of a combination of multiple heat exchange plates of different functional types stacked in a specific order. In some embodiments, the functional heat exchange structure may include at least an upper heat exchange plate, a first heat exchange plate, a second heat exchange plate, a third heat exchange plate, and a lower heat exchange plate. In an actual arrangement, the heat exchange plates are layered on top of each other so as to form channel-like flow channel cavities out of the corresponding flow channels in the form of etched grooves. A combination method between the functional heat exchange structures may be set as a reference example using structures such as those shown in FIG. 8 and FIG. 9, and may be set as appropriate in actual operation. As shown in FIG. 8, the upper heat exchange plate 1096*a* is disposed above the first heat exchange plate 1096*b*, and a grooved flow channel between the upper heat exchange plate 1096*a* and the first heat exchange plate 1096*b* constitutes the low-pressure flow channel 1091. The first heat exchange plate 1096*b* is provided above the second heat exchange plate 1096*c*, and the second heat exchange plate 1096*c* is provided above the third heat exchange plate 1096*d*, and a combination of a grooved flow channel between the first heat exchange plate 1096*b*, the second heat exchange plate 1096*c*, and a grooved flow channel between the second heat exchange plate 1096*c* and the third heat exchange plate 1096*d* form the heat exchange medium flow channel 1093. The lower heat exchange plate 1096*e* is provided below the third heat exchange plate 1096*d*, and a grooved flow channel between the third heat exchange plate 1096*d* and the lower heat exchange plate 1096*e* constitutes the high-pressure flow channel 1092. FIG. 9 is similar to FIG. 8, with the difference being that the high-pressure flow channel 1092 is set at a different position.

In some embodiments, for the upper heat exchange plate and the lower heat exchange plate, a straight flow channel, a wavy structure, or a serrated structure, etc., may be arranged along a direction of liquid flow. A flow resistance of the straight flow channel is relatively small, and the wavy structure or the serrated structure has a better heat exchange effect.

In some embodiments, the heat exchange medium flow channel 1093 may include a main flow channel and an auxiliary flow channel. In some embodiments, the main flow channel may include a first main flow channel, a second main flow channel, and the auxiliary flow channel includes a first auxiliary flow channel and a second auxiliary flow channel. In some embodiments, the heat exchange medium flow channel 1093 may be a sequential stacked structure including the first main flow channel, the first auxiliary flow channel, the second auxiliary flow channel, and the second main flow channel, and the first main flow channel and the first auxiliary flow channel are connected to each other to form an upper heat source cavity, and the second main flow channel and the second auxiliary flow channel are connected to each other to form a lower heat source cavity. Along a stacking direction of the heat exchange medium flow channel, the second auxiliary flow channel and the first main flow channel are adjacent to each other, and the second main flow channel and the first auxiliary flow channel are adjacent to each other. In the same layer of heat source cavities, a flow area of the main flow channel is larger than a flow area of the auxiliary flow channel, and the main flow channel and the auxiliary flow channel intersect with each other such that an intersection form a connection point intersect with each other.

In some embodiments, the main flow channel may be a single large groove, and the auxiliary flow channel may be a plurality of small grooves. In some embodiments, a bottom dimension of each main flow channel (i.e., a single large groove) may be a sum of a top dimension of each auxiliary flow channel (i.e., a plurality of small grooves) and a dimension of an intermediate solid connection segment. In some embodiments, each of the grooves (including the large groove and the small grooves, etc.) is a wavy structure or a serrated structure formed by bending along a length direction of the heat exchange plate, and the upper heat source cavity and the lower heat source cavity formed are also a wavy structure or a serrated structure.

Figure 2:
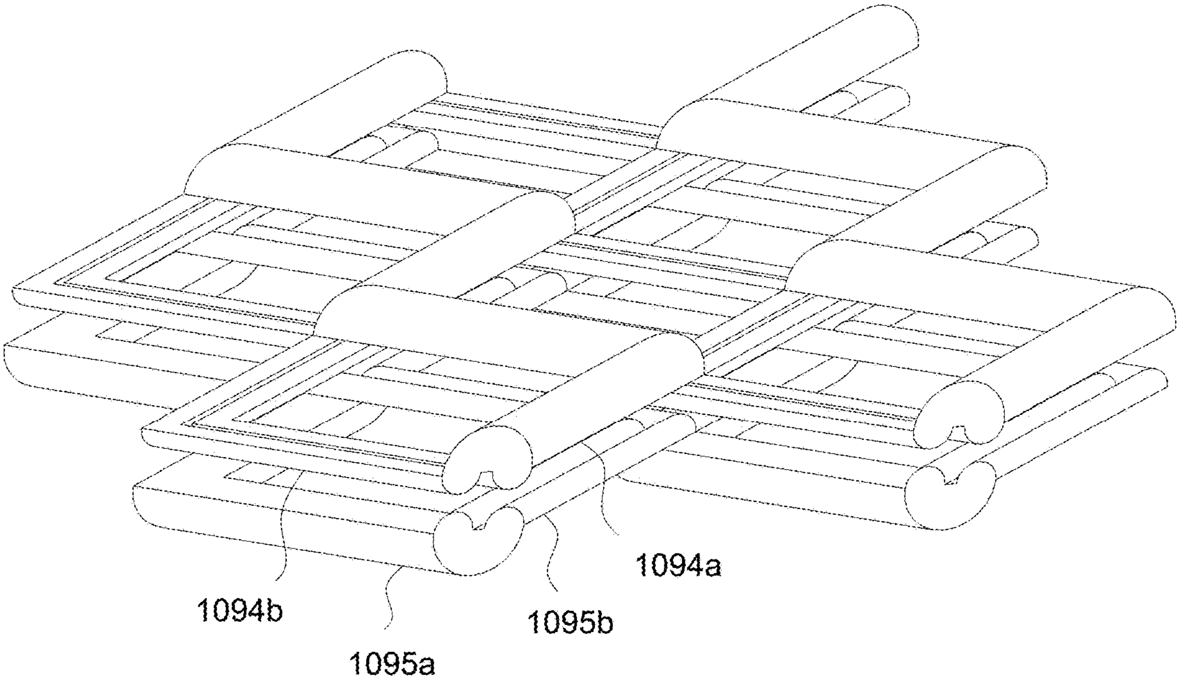
FIG. 2 is a diagram illustrating a state of a flow channel arrangement of an upper heat source cavity and a lower heat source cavity of Embodiment 1, according to some embodiments of the present disclosure.
Figure 6:
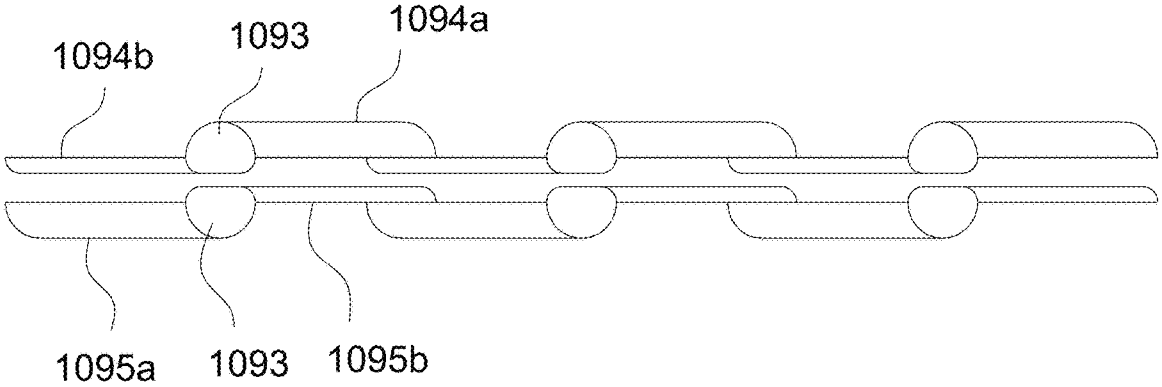
FIG. 6 is a front view illustrating a structure shown in FIG. 5 according to some embodiments of the present disclosure.
Figure 10:
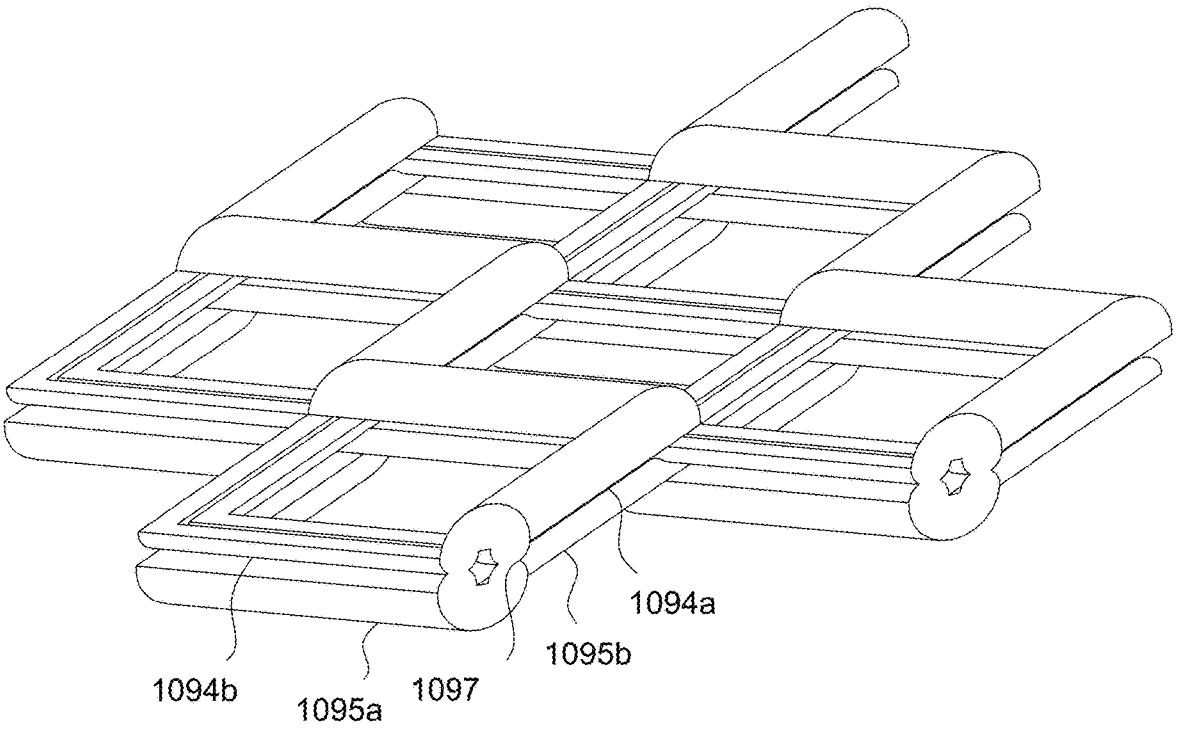
FIG. 10 is a diagram illustrating a state of a flow channel arrangement of an upper heat source cavity and a lower heat source cavity of Embodiment 3, according to some embodiments of the present disclosure.

In FIG. 2, FIG. 6 and FIG. 10, it can be seen that in a same cross-section, a flow direction between each main flow channel crosses, a flow direction between each auxiliary flow channel also crosses, and adjacent main flow channels and auxiliary flow channels also form a cross-structure, thus forming a three-dimensional mesh-format flow channel structure.

In some embodiments, the upper heat source cavity and the lower heat source cavity may be formed by a three-layer heat exchange plate cooperatively, the three-layer heat exchange plate including a first heat exchange plate 1096*b*, a second heat exchange plate 1096*c*, and a third heat exchange plate 1096*d*.

Figure 3:
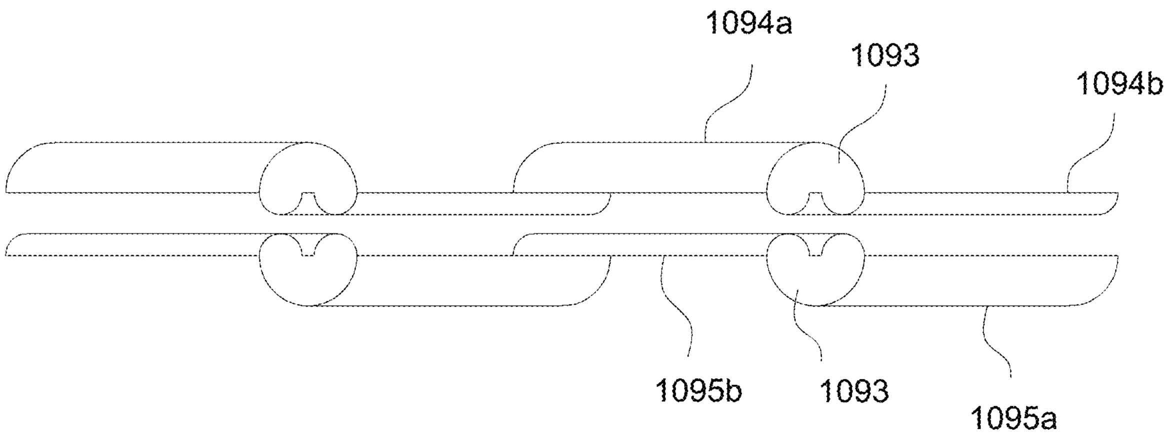
FIG. 3 is a front view illustrating a structure shown in FIG. 2 according to some embodiments of the present disclosure.

In some embodiments, as shown in FIG. 2, FIG. 3, the first heat exchange plate 1096*b* has a grooved first main flow channel 1094*a* etched at a lower plate surface of the first heat exchange plate 1096*b*, the second heat exchange plate 1096*c* has a grooved first auxiliary flow channel 1094*b* etched at an upper plate surface of the second heat exchange plate 1096*c*, the second heat exchange plate 1096*c* has a grooved second auxiliary flow channel 1095*b* etched at a lower plate surface of the second heat exchange plate 1096*c*, the third heat exchange plate 1096*d* has a grooved second main flow channel 1095*a* etched at an upper plate surface of the second main flow channel a. The main flow channel and the auxiliary flow channel intersect at the connection point, thereby forming a corresponding heat source cavity.

Figure 12:
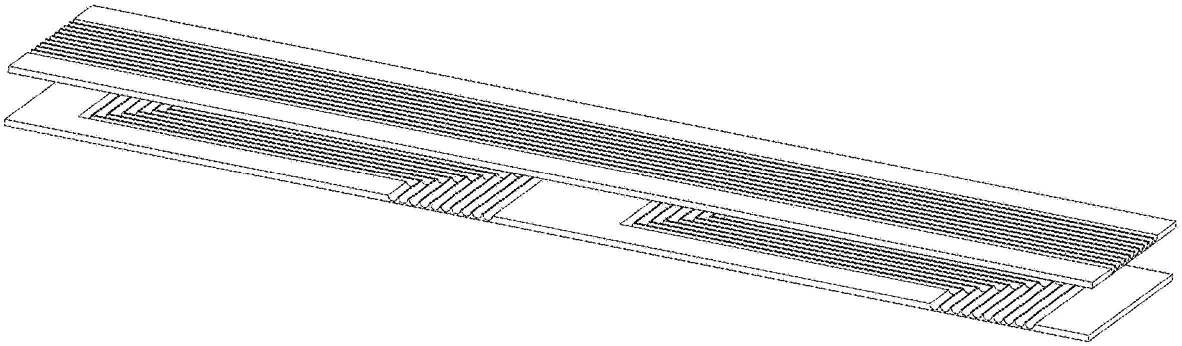
FIG. 12 is a schematic diagram illustrating a structure of a multi-stream vaporizer according to some embodiments of the present disclosure.

As shown in FIG. 12, in some embodiments, side heat exchange plates having both low-pressure flow channels and high-pressure flow channels that are independent of each other's flow channels are also arranged above or below the first heat exchange plate 1096*b*. In this embodiment, the low-pressure flow channel 1091 and the high-pressure flow channel 1092 are disposed on the same side of the heat source so as to arrange both cold sources on the same side of the heat source. The side heat exchange plates are etched with at least two separate non-interconnected flow channels in the form of grooves at different positions. Thus, the side heat exchange plates may be stacked with other heat exchange plates to form two flow channel cavities independent of each other's flow channels, e.g., a high-pressure flow channel and a low-pressure flow channel.

As shown in FIG. 8 and FIG. 9, in some embodiments, the upper heat exchange plate 1096*a* provided with the low-pressure flow channel is arranged above the first heat exchange plate 1096*b*, and the lower heat exchange plate 1096*e* provided with the high-pressure flow channel is arranged below the third heat exchange plate 1096*d*. The lower surface of the upper heat exchange plate 1096*a* is etched with the grooved low-pressure flow channel 1091. The grooved high-pressure flow channel 1092 is etched at the upper plate surface of the lower heat exchange plate 1096*e* or the grooved high-pressure flow channel 1092 is etched at the lower plate surface of the lower heat exchange plate 1096*e*. In the present embodiment, the low-pressure flow channel 1091 and the high-pressure flow channel 1092 are located on both sides of the heat source to arrange the two cold sources on each side of the heat source for the purpose of heat exchange.

For ease of description, the present disclosure sets forth the embodiments with the low-pressure flow channel 1091 and the high-pressure flow channel 1092 located on both sides of the heat source, as shown in FIG. 1.

In some embodiments, a range of angles formed between the main flow channel and the auxiliary flow channel, respectively, and a length direction of the three-layer heat exchange plate may be in a range from 0° to 15°. In some embodiments, the range of angles formed between the main flow channel and the auxiliary flow channel, respectively, and the length direction of the three-layer heat exchange plate may be in a range from 0° to 12°. In some embodiments, the range of angles formed between the main flow channel and the auxiliary flow channel, respectively, and the length direction of the three-layer heat exchange plate may be in a range from 0° to 10°. In some embodiments, the range of angles formed between the main flow channel and the auxiliary flow channel, respectively, and the length direction of the three-layer heat exchange plate may be in a range from 0° to 8°. In some embodiments, the range of angles formed between the main flow channel and the auxiliary flow channel, respectively, and the length direction of the three-layer heat exchange plate may be in a range from 0° to 5°.

In the embodiments described in the present disclosure, the range of angles formed between each main channel and auxiliary channel and the length direction of each heat exchange plate is restricted. However, generally along the length direction of the heat exchange plate, as the main channel and auxiliary channel of the same row of channel units extend outward from a base point, they still move away from each other in a direction of extension, then approach each other after reaching the farthest point, and finally converge at a turning point. This design facilitates the formation of a three-dimensional network, and it is also easier to process.

In some embodiments, each main flow channel may be one of a semicircular groove, a semi-elliptical groove, or a rectangular groove. In some embodiments, each main flow channel may be a semicircular groove or a semi-elliptical groove with a radius between 0.5 and 2 mm, or a rectangular groove with a width between 0.5 and 2 mm. In some embodiments, each main flow channel may be a semicircular groove or a semi-elliptical groove with a radius between 0.5 and 1.5 mm, or a rectangular groove with a width between 0.5 and 1.5 mm. In some embodiments, the main flow channels may all be semi-circular or semi-elliptical grooves with a radius between 0.5 and 1 mm, or rectangular grooves with a width between 0.5 and 1 mm. It should be noted that the individual main flow channels need to have the same shape, radius, and so forth.

In some embodiments, the main flow channel and the auxiliary flow channel may have a V-shape, W-shape, or wavy profile. And in the same layer of the heat source cavity, openings of the main flow channel and the auxiliary flow channel that cooperate with each other and opposite to each other, so that the openings of the main flow channel and the auxiliary flow channel are paired to form a closed-loop structure, and a connection point is provided at the joining point of the closed-loop structure.

Figure 4:
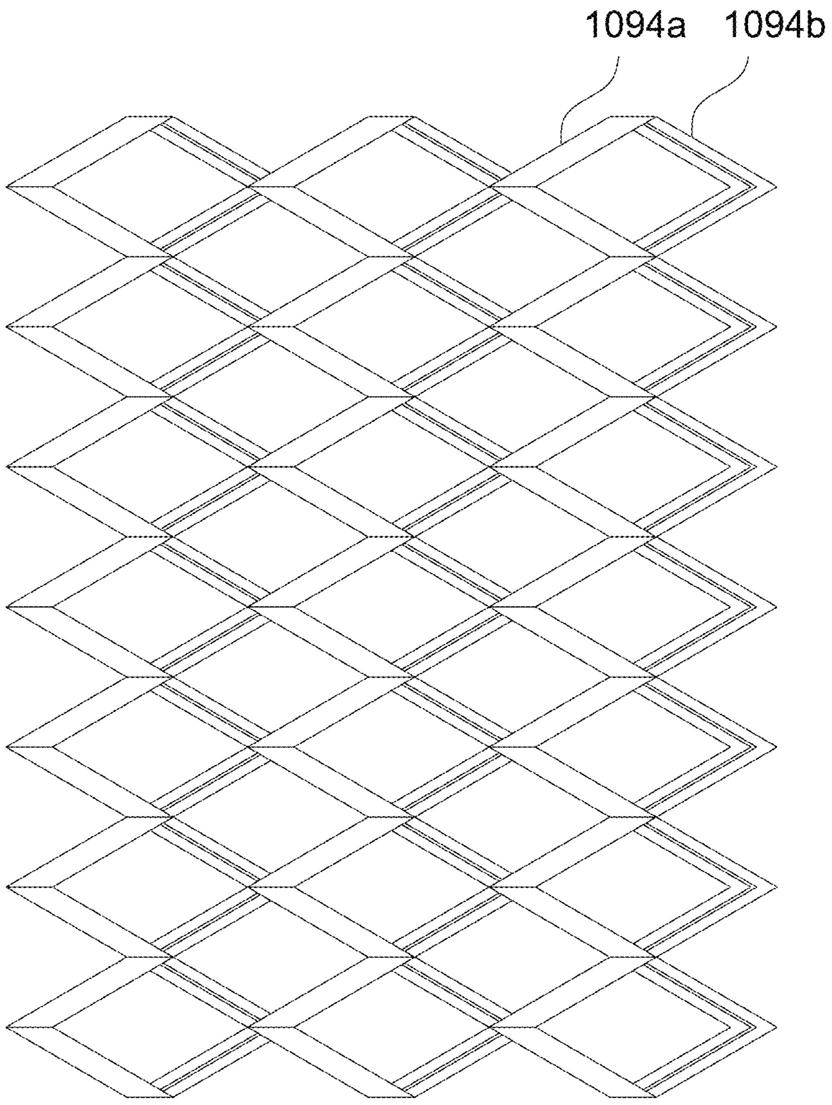
FIG. 4 is a top view illustrating the structure shown in FIG. 2 according to some embodiments of the present disclosure.

As shown in FIG. 4, in some embodiments, the second auxiliary flow channel **1095*b* is located within a projection range of the first main flow channel 1094*a*, and the second main flow channel 1095*a* is located within a projection range of the first auxiliary flow channel 1094*b*. That is, the first auxiliary flow channel 1094*b* is located directly above and arranged in close proximity to the second auxiliary flow channel 1095*a* in a top view direction, while the first main flow channel 1094*a* is located directly above and arranged in close proximity to the second auxiliary flow channel 1095*b***, forming the cross-over structure described above.

In the present disclosure, the second auxiliary flow channel is located within the projection range of the first main flow channel, and the second main flow channel is located within the projection range of the first auxiliary flow channel, which may maximize the "heat exchange and ice melting" effect of the embodiments. At this time, the second auxiliary flow channel and the first main flow channel are closest to each other, while the second auxiliary flow channel is relatively farthest from the cold source, achieves a rapid heat exchange and ice melting for the first main flow channel; the second main flow channel and the first auxiliary flow channel follow the same principle.

As shown in FIG. 2-FIG. 4, in some embodiments, the auxiliary flow channel may be formed by combining more than two independent flow channels side by side with each other. Each independent flow channel is independently connected to a corresponding main flow channel of the same layer of the heat source cavities at a connection point, respectively.

As shown in FIG. 2-FIG. 4, the first main flow channel **1094*a* and the second main flow channel 1095*a* are large grooves, and the first auxiliary flow channel 1094*b* and the second auxiliary flow channel 1095*b* are parallel and independent small grooves. At this time, the first main flow channel 1094*a*, as the large groove, and the first auxiliary flow channel 1094*b*, as the parallel small independent groove, combine to form the upper heat source cavity; the second main flow channel 1095*a*, as the large groove, and the second auxiliary flow channel 1095*b***, as the parallel small independent groove, combine to form the lower heat source cavity.

In some embodiments, each single flow channel segment of the first main flow channel **1094*a* at a bottom of the first heat exchange plate 1096*b* and each single flow channel segment of the first auxiliary flow channel 11*b* at a top of the second heat exchange plate 1096*c* are all of a same length, and the lengths of each of the single flow channels are exactly the same with respect to a degree of deviation from a center axis. This makes the upper heat source cavity formed after the combination of the overall grooves present a regularly distributed rhombic mesh flow channel configuration as shown in FIG. 2 and FIG. 4. The same is true for the lower heat source cavity formed by the second heat exchange plate 1096*c* and the third heat exchange plate 1096*d***. For more information about the single flow channel segment, please refer to the later related descriptions.

Figure 11:
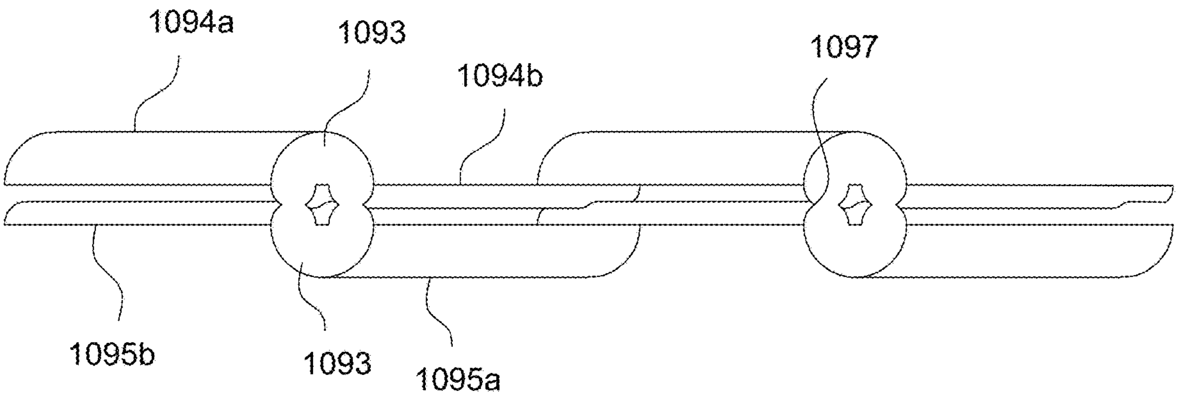
FIG. 11 is a front view illustrating a structure shown in FIG. 10 according to some embodiments of the present disclosure.

As shown in FIG. 10 and FIG. 11, in some embodiments, a bottom end of the first auxiliary flow channel **1094*b* and a top end of the second auxiliary flow channel 1095*b* intersect with each other along a stacking direction of the heat exchange medium flow channel and form a converging port 1097** at the intersection that connects the upper heat source cavity and the lower heat source cavity.

The structures shown in FIG. 10 and FIG. 11 are based on the structures shown in FIG. 2-FIG. 4, and the grooves etched at the upper plate surface and the lower plate surface of the second heat exchange plate **1096*c* are brought close to each other until the first auxiliary flow channel 1094*b* and the second main flow channel 1095*a* intersect at a spatial height. As shown in FIG. 10 and FIG. 11, the intersection, which is also a coherent line within the cavity, may form an "S"-shaped variable-thickness rotationally tangential surface, i.e., the converging port 1097. When the heat exchange medium (e.g., the ethylene glycol-water) from the first heat exchange plate 1096*b*, the second heat exchange plate 1096*c*, and the third heat exchange plate 1096*d***, each of which performs a wall-to-wall heat exchange within their respective zigzag lengths, is further rotated at the "S"-shaped variable-thickness rotationally tangential surface, the heat exchange medium (e.g., the ethylene glycol-water) is further rotated, and the heat exchange in the respective zigzag lengths is further strengthened, thereby enhancing the contact mixing effect.

Figure 5:
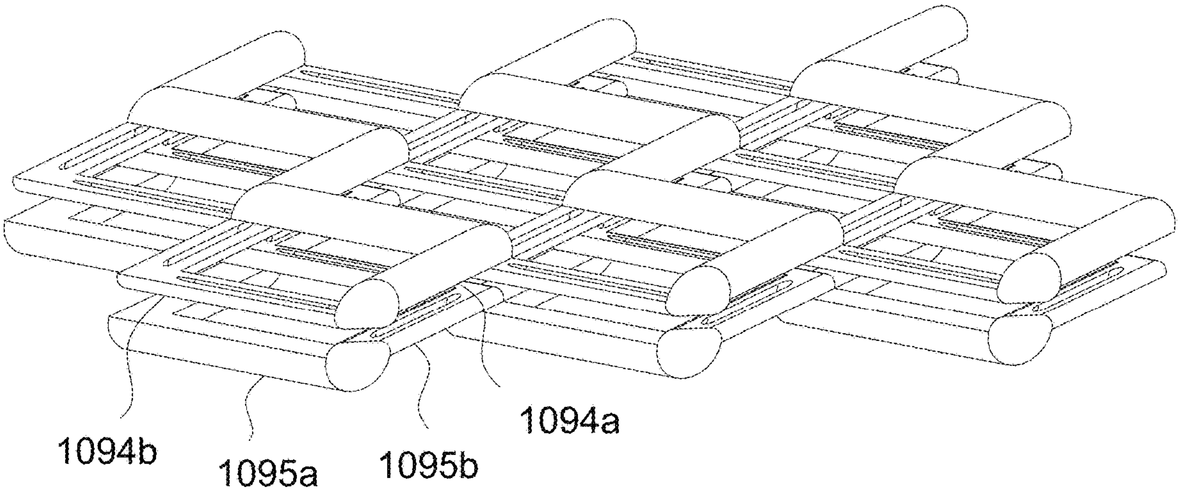
FIG. 5 is a diagram illustrating a state of a flow channel arrangement of an upper heat source cavity and a lower heat source cavity of Embodiment 2, according to some embodiments of the present disclosure.
Figure 7:
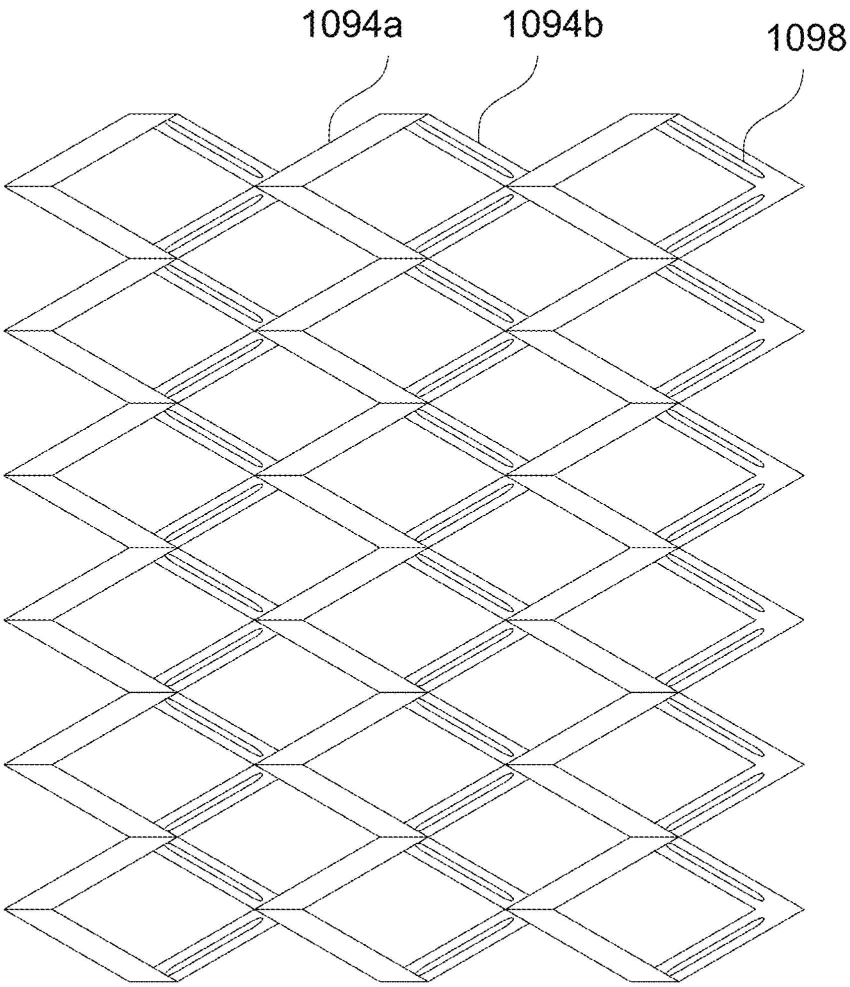
FIG. 7 is a top view illustrating the structure shown in FIG. 5 according to some embodiments of the present disclosure.

As shown in FIG. 5-FIG. 7, in some embodiments, two adjacent intersections of the main flow channel and the auxiliary flow channel of the same layer of the heat source cavities are taken as two end points, and a section of the auxiliary flow channel between the two end points forms a single flow channel segment, and a partition plate is arranged within the single flow channel segment. The partition plate 1098 extends along a length direction of the single flow channel segment, thereby separating a flow channel cavity of the single flow channel segment into at least two isolation cavities; the partition plate 1098 has a distance between ends of the partition plate 1098 and the two end points.

The structures shown in FIG. 5 to FIG. 7 are similar to the structures shown in FIG. 2 to FIG. 4. The difference is that individual auxiliary flow channel in FIGS. 5-FIG. 7 are not parallel independent small grooves, but rather entire grooves containing intermittent partition plates 1098 etched directly at the second heat exchange plate 1096*c*, which rely on the partition plates 1098 for separation to form a parallel flow structure. Compared to independent parallel small grooves, mixing of the heat exchange medium (e.g., the ethylene glycol-water) may occur in the channels without the partition plates 1098.

In some embodiments, as shown in FIG. 7, the partition plates 1098 may be protruding plate bodies or arbitrary physical dividing structures such as arcuate arches. Additionally, a number of partition plates 1098 may vary depending on the situation, with one or more sets of partition plates 1098 being possible. It should be noted that a certain amount of space needs to be left at both ends of the partition plates 1098 to allow for the convergence and mixing of the heat exchange medium (e.g., the ethylene glycol-water).

As shown in FIGS. 5-7, in some embodiments, the inflection points of the V-shaped or W-shaped main and auxiliary flow channels, or the peaks and troughs of the wavy main and auxiliary flow channels, serve as the turning points of each flow channel. A series of channel units are formed by the cooperating main and auxiliary flow channels of the same heat source cavity. The adjacent turning points of the current row of channel units and the adjacent row of channel units in the same heat source cavity are connected to each other. The channel unit consists of a turning point and the corresponding segment of the main and auxiliary flow channels in the same heat source cavity that cooperate with that turning point. Multiple channel units may be included in the same heat source cavity, and all the channel units combined form a complete heat source cavity (e.g., the upper heat source cavity or the lower heat source cavity). The adjacent turning points of the current row of channel units and the adjacent row of channel units in the same heat source cavity being connected to each other creates a smooth flow channel for the flow of the heat exchange medium.

In the embodiments described in the present disclosure, the multi-stream vaporizer relies on a unique design concept of "main and auxiliary flow channel distribution with temperature difference for ice removal". It utilizes the cooperation between the main flow channels close to the cold source and the auxiliary flow channels relatively far from the cold source. During operation, the dual cold sources naturally create a specific layered arrangement of the first main flow channel, the first auxiliary flow channel, the second auxiliary flow channel, and the second main flow channel. The difference in flow areas between the main and auxiliary flow channels ensures that during the normal operation, the ethylene glycol-water mainly flows through the main flow channels, facilitating the heat exchange with the adjacent low-pressure or high-pressure flow channels. In cases of severe freezing, which mostly occurs in the main flow channel, the auxiliary flow channel is relatively farther away from the cold source and thus has a higher temperature, making it less susceptible to freezing. As the ice blockage reduces the flow in the main flow channel, the flow in the auxiliary channel gradually exceeds that in the main channel, causing more ethylene glycol-water to enter the relatively unobstructed auxiliary flow channel. When the flow in the auxiliary flow channel exceeds that in the main flow channel, the auxiliary flow channel effectively becomes an alternative flow channel for the main flow channel, enabling a continuous flow and heat exchange of the ethylene glycol-water.

While the auxiliary flow channel function as the alternative flow channel, some ethylene glycol-water still flows into the main flow channel and continuously flushes the iced areas, achieving the effect of "mixed ice melting". On the other hand, the ethylene glycol-water entering the auxiliary flow channel, due to its proximity to the corresponding main flow channel, achieves an indirect heat exchange with the main flow channel, resulting in "heat exchanging and ice melting". Throughout this process, the ship gas supply system may continue to operate without interruption.

In summary, the embodiments described in the present disclosure effectively enhance the "ice melting effect" and ensure a flowability of the ethylene glycol-water during partial freezing by utilizing a serial flow contact heat exchange and the indirect heat exchange at a specific freezing position, and cleverly exploiting the "heat difference" resulting from different distances between the main and auxiliary flow channels and the cold source. The combined effects of "mixed ice melting" and "heat exchanging and ice melting" enable a continuous ice melting in the main and even auxiliary flow channels. This ensures a self-cleaning functionality at the freezing positions without affecting the normal operation of the vaporizer. Simultaneously, the use of contact and indirect heat exchange between the ethylene glycol-water in the upper and lower heat source cavities, and between the two flow channels within the same heat source cavity, maintains the flowability of the ethylene glycol-water at the freezing positions and suppresses the growth rate of freezing, thereby ensuring the adaptability of flow rate and temperature range regulation of the ethylene glycol-water.

By implementing the embodiments described in the present disclosure, it is possible to further eliminate the need for conventional parallel high-pressure vaporizer pipeline systems and low-pressure vaporizer pipeline systems without the requirement for a backup vaporization system. This approach saves on space, weight, and investment. At the same time, it simplifies and enhances the efficiency of the operation and control logic of the ship supply system that adopts the embodiments described in the present disclosure.

In the embodiments described in the present disclosure, there are various cooperation states between the main flow channel and auxiliary flow channel. In Embodiment 1, the auxiliary flow channel is formed by a combination of multiple independent flow channels, with the main flow channel connecting all the independent flow channels simultaneously. In Embodiment 2, the inflection point of the auxiliary flow channel serves as a converging point, while other areas are separated by one or more partition plates, also achieving the effect of multiple flow channels for the auxiliary flow channel. In Embodiment 3, the first auxiliary flow channel and the second auxiliary flow channel are close to each other and intersect, forming a connectivity relationship among the channels in a three-dimensional direction, thus enhancing connectivity.

The combination of the above-mentioned channel structures with multiple row channel units offers several beneficial effects. Firstly, the main flow channels and auxiliary flow channels within the same row of channel units may always redistribute flow at the inflection points, ensuring the flowability of the ethylene glycol-water. Secondly, flow redistribution may also occur between adjacent rows of channel units. Additionally, when the first auxiliary flow channel and the second auxiliary flow channel are close to each other and intersect, their intersection line forms a variable-thickness rotationally tangential surface similar to an "S" shape. This enhances the contact-type mixed heat exchange effect as the ethylene glycol-water flows through this area and is further spiral-cut. It also allows the ethylene glycol-water to rely on its own intersection, mixing, and flow distribution to further enhance the flowability, ensuring resistance to ice blockage and fouling blockage.

Another reason for the auxiliary flow channels to use a plurality of parallel channels or a single channel with a partition plate is to reduce an overall depth of the auxiliary flow channels for etching processing. Additionally, the groove of the main flow channel and the groove of the auxiliary flow channel are respectively opened at the two heat exchange plates, and then rely on each other to form the corresponding heat source cavities, which not only increases the flow areas of the heat source cavities for the ethylene glycol-water that is prone to freezing or fouling media, but also allows the heat source cavities to exceed the conventional diffusion welded plate heat exchange's etching depth limitations of no more than 2 mm. By connecting the single heat source cavity or even multiple layers of interconnected heat source cavities to form a three-dimensional network, the ethylene glycol-water may achieve continuous and intermittent combinations of flow forms in a three-dimensional continuously variable space, ensuring homogenization of the heat exchange efficiency in each flow channel and further reducing the risk of freezing.

For ease of understanding, the actual workflow of the ship gas supply system of the embodiments of the present disclosure is further elaborated herein in conjunction with Embodiment 1.

In actual use, according to the use of the process in the core body of the flow state of the heat exchange medium (i.e., the ethylene glycol-water), may be divided into a regular heat exchange condition without freezing or dirt not blocking the channel and a local freezing or dirt blocking the heat exchange condition of the two cases.

For the conventional heat exchange condition without freezing or dirt not blocking the channel:

The grooves within the upper heat exchange plate 1096*a* and the lower heat exchange plate 1096*e*, in conjunction with the corresponding first heat exchange plate 1096*b* or the third heat exchange plate 1096*d*, respectively, form two flow channels of the cold source, i.e., the low-pressure flow channel 1091 and the high-pressure flow channel 1092. The first heat exchange plate 1096*b*, the second heat exchange plate 1096*c*, and the third heat exchange plate 1096*d* are aligned with each other to form the corresponding upper heat source cavity and lower heat source cavity, and the combined upper and lower heat source cavities form the heat exchange medium flow channel 1093.

The upper heat source cavity and the lower heat source cavity feature a wavy or serrated flow structure, allowing the main flow channel and the auxiliary flow channel within the same heat source cavity layer to be connected at an inflection point, i.e., a connection point, and enabling the formation of a connection structure between different layers of the heat source cavities when necessary. This allows the ethylene glycol-water to flow freely within the current heat source cavity layer and between the two layers of heat source cavities. As shown in FIG. 3 at a core inlet, a cross-sectional dimension of the first main flow channel 1094*a* occupies over 60% of a total cross-sectional area of the upper heat source cavity. In this way, the majority of the ethylene glycol-water enters the first main flow channel 1094*a*, forming the main flow channel. A small amount of the ethylene glycol-water enters the first auxiliary flow channel 1094*b*, forming the auxiliary flow channel. At this point, a temperature of the ethylene glycol-water in the first main flow channel 1094*a* is lower because this channel is closer to the first cold source located above, enabling a sufficient inter-wall heat exchange. Conversely, the first auxiliary flow channel 1094*b* is relatively further away from the first cold source located above in comparison to the first main flow channel 1094*a*, leading to an insufficient interstitial heat exchange and thus resulting in a relatively higher temperature of the ethylene glycol-water within the first auxiliary flow channel 1094*b*. The second main flow channel 1095*a* and the second auxiliary flow channel 1095*b* are identical. The ethylene glycol-waters in each flow channel are converged and exchanged at each inflection point, and then the flow rate is redistributed, and then the convergence and heat exchange are repeated, until the final flow out of the core.

For a regular heat exchange condition with freezing or dirt blocking the channel:

When a severe freezing occurs, freezing sites are mostly located in the main flow channel where the temperature of the ethylene glycol-water is relatively lower, i.e., within the first main flow channel 1094*a* and the second main flow channel 1095*b*. Once the main flow channel is partially blocked, the ethylene glycol-water is not easy to pass through, and it naturally begins to flow through the auxiliary flow channel as the main channel. At this time, a portion of the ethylene glycol-water still flows into the main flow channel and constantly flush the freezing in the main flow channel, achieving the effect of "ice mixing"; the other portion of the ethylene glycol-water enters the auxiliary flow channel, as it is close to the corresponding main flow channel and the temperature of the liquid inside the auxiliary flow channel is relatively high, achieves the inter-wall heat exchanging purpose of the corresponding main flow channel, playing the role of "heat exchanging and ice melting". The combined effect of "ice mixing and melting" and "heat exchanging and ice melting" may achieve a continuous ice melting in the freezing positions of the main flow channel, ensuring a self-cleaning function of the freezing positions without affecting the normal operation of the vaporizer.

When freezing occurs in one of the small grooves in the auxiliary flow channel, the melting of the ice in the corresponding small groove may also be achieved solely by liquid impingement and interstitial heat exchange due to the presence of the other small grooves, and the connection points at the various inflection points. This is one of the reasons why the auxiliary flow channel is constructed as a parallel flow channel with multiple grooves. Particularly for the structure in Embodiment 3, the "S"-shaped variable-thickness spiral surface further enhances the spiral phenomenon of the ethylene glycol-water, further strengthening the contact mixing heat exchange function.

At this point, it may be seen that the design of the multi-stream vaporizer 10 is such that all of the heat exchange plates are considered to be a single unit, and then a hydrodynamic diameter is increased by etching the grooves and then butting them together. When a local freezing occurs, the ethylene glycol-water cleverly utilizes the "heat difference" generated by different distances between the main flow channels and the auxiliary flow channels to the cold source, through a serial contact heat exchange and an indirect heat exchange on front and back sides of a specific freezing location. This effectively enhances the "ice melting effect" and fully ensures the permeability of the ethylene glycol-water.

Certainly, when dirt (e.g. endogenous dirt due to a heat exchange process or a reaction process) blocks the flow channel, the above design of the embodiments of the present disclosure also prevents a situation in which the flow channel is completely blocked and no flow is possible. Due to the presence of the three-dimensional flow system in the embodiment described in the present disclosure, a blockage point only exist in a small region of the vast system. In particular, the corresponding main flow channel and auxiliary flow channel in this region may automatically switch between each other. Therefore, the flowability may still be guaranteed, ensuring s continuous and reliable operation of the equipment.

With the above design, the embodiments of the present disclosure may minimize the undesirable effects of ice blocking or dirt blocking, and ensure a stable operation of the heat exchange and the system.

Figure 13:
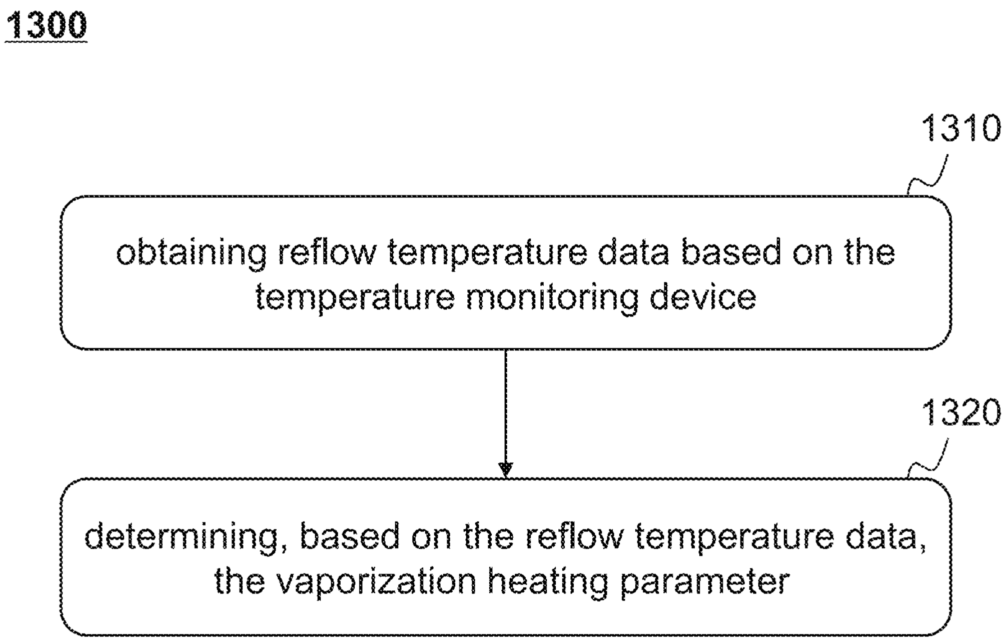
FIG. 13 is an exemplary flowchart illustrating a process for determining a vaporization heating parameter according to some embodiments of the present disclosure.

FIG. 13 is an exemplary flowchart illustrating a process for determining a vaporization heating parameter according to some embodiments of the present disclosure.

In some embodiments, the ship gas supply system 100 may further include a temperature control unit, the temperature control unit may include a first processor, and a temperature monitoring device may be provided between the second heater 1072 and the vaporizer 109.

In some embodiments, the temperature control unit is configured to determine a vaporization heating parameter and control the second heater to heat based on the vaporization heating parameter. The process for determining the vaporization heating parameter and controlling the second heater to perform the heating may be implemented by a first processor. In some embodiments, the first processor may process data and/or information obtained from other devices/components or parts. The first processor may execute program instructions based on such data, information, and/or processing results to perform one or more of the functions described in the embodiments of the present disclosure. By way of example only, the first processor may include a central processing unit (CPU), an application-specific integrated circuit (ASIC), etc., or any combination of the above. In some embodiments, the first processor may include a plurality of modules, and the different modules may be used to execute different program instructions.

The following is an exemplary illustration of the manner in which the vaporization heating parameter is determined by process 1300. In some embodiments, process 1300 may be performed by the first processor. As shown in FIG. 13, process 1300 specifically includes the following steps.

Step 1310, obtaining reflow temperature data based on the temperature monitoring device.

The reflow temperature data is a temperature of the heat exchange medium (e.g., the ethylene glycol-water) exiting the vaporizer 109.

The temperature monitoring device may be configured to monitor a temperature of the heat exchange medium exiting the vaporizer 109. In some embodiments, the temperature monitoring device may include a temperature sensor, a temperature detection instrument, or the like. In some embodiments, the temperature monitoring device may be communicatively connected to the temperature control unit to send the monitored reflow temperature data to the first processor of the temperature control unit.

Step 1320, determining, based on the reflow temperature data, the vaporization heating parameter.

The vaporization heating parameter is a parameter that heats the heat exchange medium flowing through the second heater 1072. In some embodiments, the vaporization heating parameter may include a heating power, a target heating temperature, or the like. The target heating temperature is a temperature to which the heat exchange medium is to be heated.

In some embodiments, the first processor may predetermine, based on historical experience, a control table that includes a correspondence between the reflow temperature data and the vaporization heating parameter, and then determine the vaporization heating parameter from the control table. The control table may include reflow temperature data and one-to-one correspondence of preset heating parameters. For example, the lower the reflow temperature of the ethylene glycol-water is, the larger the corresponding preset heating parameter will be.

As previously described, the second heater 1072 is used to heat the heat exchange medium (e.g., the ethylene glycol-water) exiting the vaporizer 109, thereby restoring the heat exchange medium to a higher temperature. Because the lower the temperature of the heat exchange medium flowing out of the LNG in the vaporizer 109 after vaporization, the more heat is required for heat exchange. In this case, it is necessary to appropriately increase the vaporization heating parameter to increase the heating temperature of the heat exchange medium to ensure that the heated heat exchange medium may be circulated to carry out the process of vaporizing the LNG.

In some embodiments, the first processor may obtain reflow temperature data, query a preset heating parameter corresponding to the obtained reflow temperature data from a cross-reference table, and determine the preset heating parameter as the vaporization heating parameter.

In some embodiments, the first processor may also set a parameter base value and a reflow temperature reference value. When the obtained reflow temperature data is lower than the reflow temperature reference value, the first processor may adjust the vaporization heating parameter higher on the parameter base value to obtain the desired vaporization heating parameter. For example, a parameter base value of the target heating temperature in the vaporization heating parameter may be set to 50° C., and a reference value of the reflow temperature may be set to a value higher than the melting temperature of the heat exchange medium (e.g., the ethylene glycol-water).

In some embodiments, the first processor may be further configured to obtain a trained temperature prediction model based on a cloud server and predict future return temperature data based on a reflow temperature data sequence by the temperature prediction model.

In some embodiments, the temperature prediction model is a machine learning model. For example, a convolutional neural network model, a time series model, a long short-term memory networks (LSTM) model, a recurrent neural network (RNN) model, or the like.

An input of the temperature prediction model may include a reflow temperature data sequence. An output of the temperature prediction model may include future return temperature data. The reflow temperature data sequence is a sequence consisting of reflow temperature data arranged in time. The reflow temperature data sequence consists of a plurality of reflow temperature data within a time period. The future reflow temperature data is reflow temperature data of a future moment in time.

In some embodiments, the cloud server may be trained to obtain the temperature prediction model by a plurality of first training samples with first training labels. In some embodiments, the first training samples may at least include sample return temperature data sequences. The sample reflow temperature data sequences are sequences consisting of a plurality of historical reflow temperature data monitored during a first historical time period. The first training labels may be one or more historical reflow temperature data during a second historical time period. The second historical time period is occurred after the first historical time period.

In some embodiments, a training process of the temperature prediction model may include: inputting sample reflow temperature data into an initial temperature prediction model, obtaining future return temperature data output from the initial temperature prediction model; constructing a loss function based on an output of the initial temperature prediction model and the first training labels to construct the loss function; updating parameters of the initial temperature prediction model based on the loss function; and obtaining the trained temperature prediction model in response to satisfying a training completion condition. The training completion condition may include one or more of a loss value arrived at by the loss function being less than a preset loss value, the loss value being minimized, or the loss value being unchanged for a number of consecutive times.

In some embodiments, the training process of the temperature prediction model may be completed by training in the cloud server, and the first processor may directly access the trained temperature prediction model to make predictions. The cloud server is a cloud server for the ship gas supply system. The first processor may communicate with the cloud server via any one or more of a wired network or a wireless network to exchange data and/or information. The cloud server may be implemented on a cloud platform or provided virtually. By way of example only, the cloud platform may include a private cloud, a public cloud, a hybrid cloud, a community cloud, a distributed cloud, an on-premises cloud, a multi-tiered cloud, etc. or any combination of these.

In the embodiments of the present disclosure, by predicting reflow temperature data at a future moment, the vaporization heating parameter may be adjusted ahead of time to ensure that there is sufficient heat required for heat exchange in the vaporizer 109 and to prevent the occurrence of freezing. Through use a self-learning ability of the machine learning model to find the rule from a large amount of historical data by using the temperature prediction model to predict the reflow temperature data in the future, a relationship between the reflow temperature data series and the future reflow temperature data is obtained, which improves the accuracy and efficiency of predicting the future reflow temperature data, then determine the more suitable vaporization heating parameter.

In some embodiments, the input of the temperature prediction model may also include a prediction time length and a gas flow rate.

The prediction time length is a length of time that the future return temperature data to be predicted is from a current moment. For example, the prediction time length may be 3 minutes, 5 minutes, etc. The prediction time length may be preset based on experience. The flow of the heated heat exchange medium to the vaporizer 109 takes a certain amount of time, and therefore a suitable prediction time length needs to be set so that the temperature of the heat exchange medium when it returns to the vaporizer 109 is just suitable for the prevailing heat exchange heat demand at that time to avoid the occurrence of freezing.

The gas flow rate is a flow rate of liquefied natural gas LNG from the low-pressure treatment pipeline 103 and the high-pressure treatment pipeline 104, or it may be expressed directly as an LNG flow rate. The LNG flow rate may be determined based on valve sizes of the second regulating valve CV2 and the third regulating valve CV3. The LNG flow rate may also be determined by monitoring from the installation of flow rate sensors from the low-pressure treatment pipeline 103 and the high-pressure treatment pipeline 104, or by the amount of LNG output from the ship gas supply system that is monitored. The faster the gas flow rate is, the more LNG that needs to be heat exchanged for vaporization, and the faster the heat is consumed, which may result in affecting the future reflow temperature data.

In some embodiments, when the input of the temperature prediction model also includes a prediction time length and a gas flow rate, corresponding first training samples need to include sample prediction time lengths and sample gas flow rates.

In the present disclosure, the inclusion of the prediction time length and the gas flow rate in the input of the temperature prediction model may result in more an accurate prediction of the temperature prediction model, thereby allowing for the determination of more appropriate vaporization heating parameter.

In some embodiments, to determine the predicted time length, the first processor is further configured to: statistically analyze change time differences between historical vaporization heating parameters, historical reflow temperature data, and historical vaporization pressurization parameters, and determine a mapping relationship between a vaporization pressurization parameter and a liquid circulation time; determine, based on the vaporization pressurization parameter and the mapping relationship, the liquid circulation time; determine, based on the liquid circulation time and a pipeline length, the prediction time length.

In some embodiments, the first processor may calculate the time differences in the variations of historical vaporization heating parameters, historical reflow temperature data, and historical vaporization pressurization parameters, and determine a mapping relationship between the vaporization pressurization parameter and the liquid circulation length.

The historical vaporization heating parameters are vaporization heating parameters of historical time periods. The historical reflow temperature data is reflow temperature data of the historical time periods. The historical vaporization pressurization parameters are vaporization pressurization parameters of the historical time periods. For more information about the vaporization pressurization parameter, please refer to FIG. 14 and its related descriptions, which is not repeated herein. The first processor may record the historical vaporization heating parameters, the historical reflow temperature data, and the historical vaporization pressurization parameters and store them in a storage device or a cloud server for future use. The historical vaporization heating parameters, the historical reflow temperature data, and the historical vaporization pressurization parameters need to correspond to a same historical time period.

The change time differences are differences between change times of the vaporization heating parameter and the change times of the reflow temperature data. The change times of the vaporization heating parameter are moments when the vaporization heating parameter changes, and the change times of the reflow temperature data is the moments when the reflow temperature changes. When the vaporization heating parameter changes, the temperature of the heated heat exchange medium changes. However, there will be a certain time difference between the completion of heating the heat exchange medium and the completion of heat exchange within the vaporizer 109, and this time difference is a change time difference. A time length required for the heat exchange medium to return from the second heater 1072 to the medium storage tank 1051, and then pass through the low-pressure pressurization pump 1013, the vaporizer 109, and to the temperature monitoring unit in this circulation (i.e., the liquid circulation length) may be determined based on the change time difference.

In some embodiments, for the purpose of accounting for the change time differences, for each of a plurality of preset historical time periods, the first processor may plot a corresponding first time-temperature curve based on the historical vaporization heating parameters, and plot a corresponding second time-temperature curve based on the historical reflow temperature data. Each of the preset historical time periods corresponds to a historical vaporization pressurization parameter. In other words, the first processor may use a time period corresponding to the same historical vaporization pressurization parameter as a preset historical time period. For example, if the vaporization pressurization parameter is P1 during the time period t1~t2 and the vaporization pressurization parameter is P2 during the time period t2~t3, t1~t2 and t2~t3 may be preset historical time periods, respectively.

In some embodiments, the first processor may determine the matching of two curve segments based on a shape of the first time-temperature curve and a shape of the second time-temperature curve. For example, if a curve segment s1 of the first time-temperature curve rises and then falls, and a curve segment s2 of the second time-temperature curve also rises and then falls, and durations of the rise and the fall are similar, it is possible to consider that s1 and s2 are well-matched, and s1 and s2 may be used as the two matching curve segments.

In some embodiments, the first processor may further use a time difference between the two matching curve segments as the change time difference for that preset historical time period. The time change difference may be determined for each of the preset historical time periods, thereby determining a mapping relationship between the vaporization pressurization parameter and the change time difference.

In some embodiments, the first processor may, based on a current vaporization pressurization parameter, query a mapping relationship between the vaporization pressurization parameter and the change time difference, determine a corresponding change time difference, and determine the same as the liquid circulation time length.

In some embodiments, the first processor may determine the prediction time length based on the liquid circulation time length and the pipeline length in multiple ways. The pipeline length may include at least a length of a first segment pipeline and a length of a second segment pipeline. The first segment pipeline may be a pipeline from the second heater 1072 back to the medium storage tank 1051, and then through the low-pressure pressurized pump 1013, the vaporizer 109, to the temperature monitoring unit as a complete circulation. The second segment pipeline may be a section of pipeline from the low-pressure pressurization pump 1013 to the vaporizer 109.

In some embodiments, the first processor may combine the liquid circulation time length and a pipeline ratio to calculate the prediction time length. The pipeline ratio is a ratio between the length of the second segment pipeline and the length of the first segment pipeline. For example, the prediction time length may be equal to the liquid circulation time length multiplied by the pipeline ratio.

In the present disclosure, the process for determining the prediction time length based on the liquid circulation time length and the pipeline length allows for a more accurate prediction time length to be used in determining the future reflow temperature data.

In some embodiments, the first processor may also be configured to predict the future reflow temperature data based on the temperature prediction model and to determine the vaporization heating parameter.

In some embodiments, the first processor may determine the vaporization heating parameter based on a cross-reference table that contains a correspondence between the reflow temperature data and the vaporization heating parameter. The difference is that the first processor may obtain the future reflow temperature data, query a preset heating parameter corresponding to the future reflow temperature data from the cross-reference table, and determine the preset heating parameter to be the vaporization heating parameter.

In some embodiments, the first processor may also determine the vaporization heating parameter based on a parameter base value and a reflow temperature reference value. Similarly, the first processor may replace the reflow temperature data with the future reflow temperature data and determine whether the future reflow temperature data is lower than the reflow temperature reference value in order to determine the vaporization heating parameter.

In the present disclosure, by monitoring the reflow temperature data, the heating temperature of the heat exchange medium may be increased by determining the vaporization heating parameter, ensuring that the heat required for heat exchange in the vaporizer 109 is sufficient, and preventing freezing.

The foregoing description of process 1300 is intended to be exemplary and illustrative only, and does not limit the scope of application of the present disclosure. For those skilled in the art, various corrections and changes may be made to process 1300 under the guidance of the present disclosure. These corrections and changes, however, remain within the scope of the present disclosure.

Figure 14:
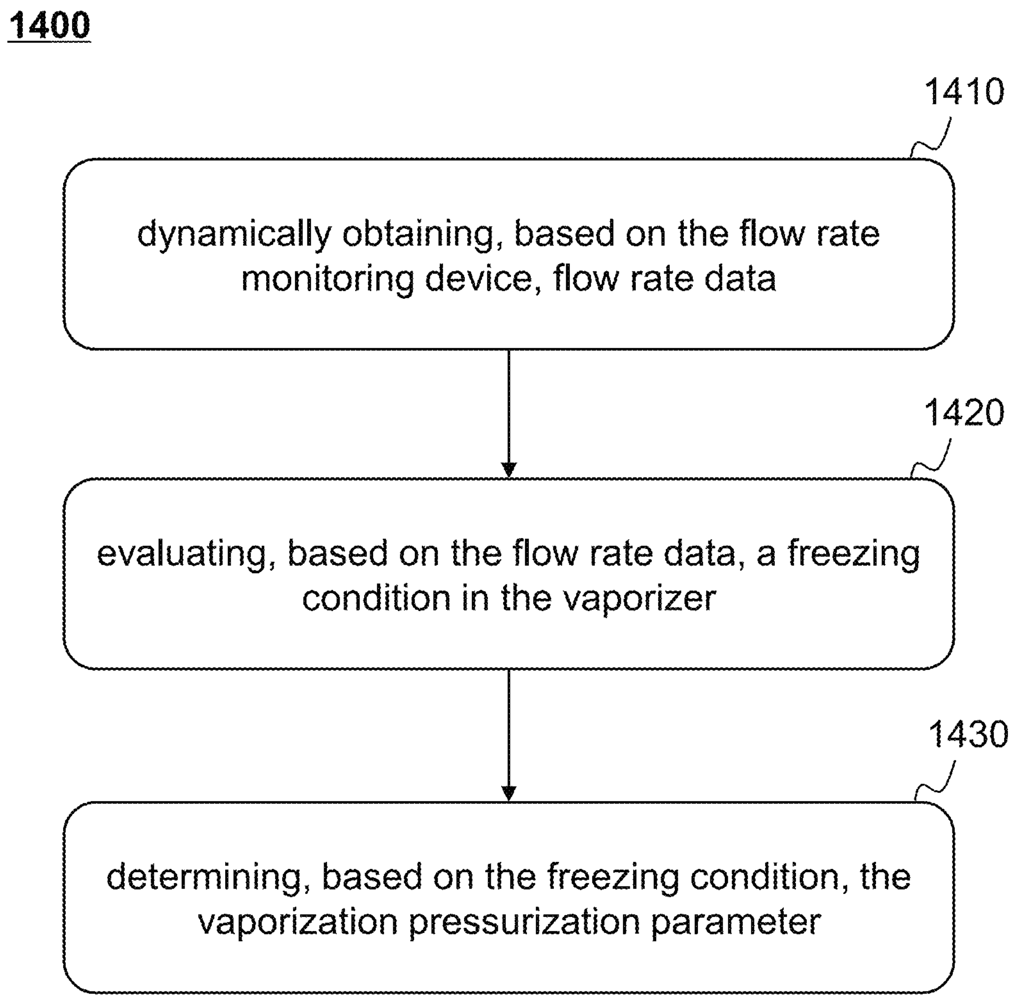
FIG. 14 is an exemplary flowchart illustrating a process for determining a vaporization pressurization parameter according to some embodiments shown in the present disclosure.

FIG. 14 is an exemplary flowchart illustrating a process for determining a vaporization pressurization parameter according to some embodiments shown in the present disclosure.

In some embodiments, the ship gas supply system 100 may further include a pressure control unit, which may include a second processor. A flow rate monitoring device may be disposed between a fourth control valve CV4 and the second heater 1072.

In some embodiments, the pressure control unit is configured to determine the vaporization pressurization parameter and control the low-pressure booster pump to pressurize based on the parameter. The process for determining the vaporization pressurization parameter and controlling the low-pressure booster pump to pressurize based on the parameter may be achieved through a second processor. In some embodiments, the second processor may process data and/or information obtained from other devices/components or constituent parts. The second processor may execute program instructions based on these data, information, and/or processing results to perform one or more functions described in the embodiments of the present disclosure. By way of example only, the second processor may include a central processing unit (CPU), an application-specific integrated circuit (ASIC), or any combination of the above. In some embodiments, the second processor may include multiple modules, with different modules used to execute different program instructions respectively. In some embodiments, the second processor and the first processor may be the same processor, or they may be two separate processors.

Exemplary explanation is provided below on the manner for determining the vaporization heating parameter through process 1400. In some embodiments, process 1400 may be executed by the second processor. As shown in FIG. 14, process 1400 specifically includes the following steps:

Step 1410, dynamically obtaining, based on the flow rate monitoring device, flow rate data.

The flow rate data refers to a flow rate of the heat exchange medium that is recirculated from the vaporizer 109 back to the medium storage tank 1051.

The flow rate monitoring device may be configured to monitor a flow rate of the heat exchange medium recirculated from the vaporizer 109 back to the medium storage tank 1051. In some embodiments, the flow rate monitoring device may include a flow sensor, a flow detection instrument, etc. In some embodiments, the flow rate monitoring device may be communicatively connected to the pressure control unit to send monitored flow rate data to the second processor of the pressure control unit.

In some embodiments, the second processor may dynamically obtain the flow rate data. For example, the flow rate monitoring device may monitor the flow rate data in real time, and the second processor may obtain the monitored flow rate data from the flow rate monitoring device every preset time interval. The preset time interval may be 5 minutes, 10 minutes, 30 minutes, 1 hour, etc.

Step 1420, evaluating, based on the flow rate data, a freezing condition in the vaporizer.

The freezing condition refers to a freezing situation of the heat exchange medium in the vaporizer 109. Taking the ethylene glycol-water as an example of the heat exchange medium, due to its relatively high freezing point, freezing may occur when the heat in the ethylene glycol-water is absorbed by the LNG in the low-pressure treatment pipeline 103 or the high-pressure treatment pipeline 104. The freezing condition may be expressed by indicators such as a number of heat exchange medium flow channels 1093, a degree of freezing blockage, etc. The degree of freezing blockage may be represented by at least one of indicators such as a freezing area on a cross-section of the heat exchange medium flow channel 1093, a freezing length of the heat exchange medium flow channel 1093, and a blockage percentage of the heat exchange medium flow channel 1093.

In some embodiments, the second processor may predetermine standard flow rate data corresponding to different vaporization pressurization parameters under non-freezing conditions. Then, the freezing condition may be determined based on a ratio of real-time measured flow rate data to the standard flow rate data. For example, if the standard flow rate data is 1 liter per second and the real-time measured flow rate data is 0.78 liters per second, the freezing condition may be expressed as 78%.

In some embodiments, to determine the freezing condition, the second processor may further evaluate a trained freezing evaluation model based on a cloud server. The freezing condition may then be determined through the freezing evaluation model based on the flow rate data, the vaporization heating parameters, and the reflow temperature data.

In some embodiments, the freezing evaluation model may be a machine learning model. For example, it can be a convolutional neural network model, a deep neural network (DNN) model, or the like.

In some embodiments, an input of the freezing evaluation model may include the flow rate data, the vaporization heating parameter, and the reflow temperature data. An output of the freezing evaluation model may include the freezing condition. For more information about the vaporization heating parameter and the reflow temperature data, please refer to FIG. 13 and its related descriptions, which is not be repeated here.

In some embodiments, the cloud server may train the freezing evaluation model using multiple second training samples with second training labels. The second training samples may include at least sample flow rate data, sample vaporization heating parameters, and sample return temperature data. These sample data may be obtained from historical data. The second training labels may be actual freezing conditions corresponding to the second training samples. The actual freezing conditions may be determined by opening the heat exchange plates (e.g., the upper heat exchange plate 1096*a*, the first heat exchange plate 1096*b*, the second heat exchange plate 1096*c*, the third heat exchange plate 1096*d*, the lower heat exchange plate 1096*e*, etc.) under different sample data conditions, thus creating freezing situations.

In some embodiments, a training process of the freezing evaluation model may include: inputting the sample flow rate data, the sample vaporization heating parameters, and the sample reflow temperature data into an initial freezing evaluation model to obtain the freezing condition output by the initial freezing evaluation model; constructing a loss function based on an output of the initial freezing evaluation model and the second training labels; updating parameters of the initial freezing evaluation model based on the loss function; and obtaining the trained freezing evaluation model when a training completion condition is met. The training completion condition may include one or more of a loss value of the loss function being less than a preset loss value, the loss value reaching a minimum, or the loss value remaining unchanged for consecutive iterations.

In some embodiments, the training process of the freezing evaluation model may be completed on the cloud server, and the second processor may directly obtain the trained freezing evaluation model to determine the freezing condition.

In the embodiments of the present disclosure, determining the freezing condition through the freezing evaluation model may leverage the self-learning ability of machine learning models to find patterns from a large amount of historical data and capture the relationship between flow rate data, vaporization heating parameters, return temperature data, and the freezing condition. This improves the accuracy and efficiency of predicting the freezing condition, enabling the determination of more suitable vaporization and pressurization parameters.

In some embodiments, the input of the freezing evaluation model may also include heat exchange structure features of the vaporizer 109. These heat exchange structure features may include a first relative position feature between the low-pressure flow channel 1091 and the heat exchange medium flow channel 1093, the second relative position feature between the high-pressure flow channel 1092 and the heat exchange medium flow channel 1093, and an internal structural feature of the heat exchange medium flow channel 1093.

The heat exchange structure features are structural features within the vaporizer 109. These features may affect the flow rate of the heat exchange medium (e.g., the ethylene glycol-water) in the heat exchange medium channel 1093, a degree of heat exchange sufficiency, a rate of heat loss, and other conditions, thereby influencing the freezing condition. Therefore, the heat exchange structure features may also be used as the input of the freezing evaluation model.

In some embodiments, the first relative position feature and the second relative position feature may include features such as a relative distance, a relative orientation, and a relative direction between the two. The internal structural feature of the heat exchange medium flow channel 1093 may include shapes of the main flow channel and the auxiliary flow channel, the angles between the main flow channel and the auxiliary flow channel, and parameters of the heat exchange plates and/or partition plates (e.g., a number of layers, a thickness, a material, a thermal conductivity, etc.).

In some embodiments, the heat exchange structure features may be preset by a user, and the second processor may obtain the heat exchange structure features from a storage device or a cloud server.

In the embodiments of the present disclosure, considering the heat exchange structure features when determining the freezing condition may make an evaluation result of the freezing evaluation model more accurate, thereby enabling the determination of more suitable vaporization pressurization parameters.

Step 1430, determining the vaporization pressurization parameter based on the freezing condition.

The vaporization pressurization parameter refers to a parameter applied by the low-pressure booster pump 1013 to the heat exchange medium flowing out of the medium storage tank 1051. In some embodiments, the vaporization pressurization parameter may include an applied pressure and a target flow rate. The target flow rate represents a desired flow velocity of the heat exchange medium.

In some embodiments, the second processor may statistically determine optimal pressurization parameters corresponding to different freezing conditions based on historical data, and then determine the corresponding optimal pressurization parameters as the vaporization pressurization parameters based on the freezing condition determined in step 1420. If the freezing condition is more severe, the vaporization pressurization parameters may be larger to use greater liquid pressure to break or melt the ice. At the same time, as the liquid pressure increases, the flow rate also increases, leading to less sufficient heat exchange, and the heat retention of the heat exchange medium (e.g., the ethylene glycol-water) also increases, which may slow down the freezing.

The optimal pressurization parameters refer to gradually increasing the vaporization pressurization parameters under a certain freezing condition, and the liquid flow rate data may also gradually increase. When the liquid flow rate increases to the standard flow rate data, it indicates that the ice is basically broken or melted, and the vaporization pressurization parameters at this time are the optimal pressurization parameters for that freezing condition.

In some embodiments, after controlling the low-pressure booster pump 1013 to pressurize according to the adjusted vaporization pressurization parameters, the liquid flow rate data gradually recovers. When the flow rate data returns to the standard flow rate data corresponding to a non-freezing condition, the second processor may adjust back to the basic or pre-adjusted vaporization pressurization parameters.

In some embodiments, to address the freezing condition, the vaporization pressurization parameters may need to be increased, but they cannot be excessively large. If the vaporization pressurization parameters are too large, the flow rate in the pipeline is also too fast, which may consume more energy on one hand, and on the other hand, the excessively fast flow rate also prevents sufficient heat exchange, thus weakening the LNG supply capacity. Therefore, the vaporization pressurization parameters need to be less than a pressurization threshold, which may be set based on experience or actual conditions.

In the embodiments of the present disclosure, assessing the freezing condition based on the flow rate data and determining the vaporization pressurization parameters accordingly may mitigate and prevent potential freezing conditions in the vaporizer 109, ensuring the continuation of heat exchange.

It should be noted that the above description of process 1400 is merely for the purpose of example and explanation, and does not limit the scope of application of the present disclosure. For those skilled in the art, various modifications and changes can be made to the process 1400 under the guidance of the present disclosure. However, these modifications and changes still fall within the scope of the present disclosure.

The basic concepts have been described above, apparently, in detail, as will be described above, and does not constitute limitations of the disclosure. Although there is no clear explanation here, those skilled in the art may make various modifications, improvements, and modifications of present disclosure. This type of modification, improvement, and corrections are recommended in present disclosure, so the modification, improvement, and the amendment remain in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be multiple useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate+20% variation of the value it describes. Accordingly, in some embodiments, the numerical parameters used in the specification and claims are approximate values, and the approximation may change according to the characteristics required by the individual embodiments. In some embodiments, the numerical parameter should consider the prescribed effective digits and adopt a general digit retention method. Although in some embodiments, the numerical fields and parameters used to confirm the breadth of its range are approximate values, in specific embodiments, such numerical values are set as accurately as possible within the feasible range.

With respect to each patent, patent application, patent application disclosure, and other material cited in the present disclosure, such as articles, books, manuals, publications, documents, etc., the entire contents thereof are hereby incorporated by reference into the present disclosure. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those described in the present disclosure, the descriptions, definitions, and/or use of terms in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An LNG gas supply system for a ship, comprising an LNG storage tank, a BOG pipeline for outputting evaporated gas of natural gas, a first LNG pipeline, a second LNG pipeline, and an ethylene glycol-water heating pipeline, wherein:

the LNG storage tank is connected with the BOG pipeline, the first LNG pipeline, and the second LNG pipeline, respectively, wherein:

the BOG pipeline includes a first regulating valve and a first-stage compressor unit arranged sequentially along a gas flow direction of the BOG pipeline, an outlet of the first-stage compressor unit being provided with a first branch pipeline and a second branch pipeline, the first branch pipeline being connected with a host via a second-stage compressor unit, and the second branch pipeline being connected with a first heater and a generator set sequentially via a fifth regulating valve;

the first LNG pipeline includes a second regulating valve, a first cold source of a multi-stream vaporizer, and a separator arranged sequentially along a gas flow direction of the first LNG pipeline, and the separator being connected with the generator set via the first heater;

the second LNG pipeline includes a third regulating valve, a first booster pump and a second cold source of the multi-stream vaporizer arranged sequentially along a gas flow direction of the second LNG pipeline, and the second cold source being connected with the host; wherein the first booster pump is used to pressurize LNG to a first pressure; and the ethylene glycol-water heating pipeline includes a medium storage tank for storing ethylene glycol water, the ethylene glycol water being discharged from the medium storage tank and then returning to the medium storage tank after sequentially passing through a second booster pump, a heat source of the multi-stream vaporizer, a fourth regulating valve, and a second heater; the multi-stream vaporizer includes a pipe box and a core, the core being used to form flow channels, the flow channels including a first LNG flow channel constituting the first cold source, a heat exchange medium flow channel constituting the heat source, and a second LNG flow channel constituting the second cold source; the heat exchange medium flow channel is a sequential stacked structure including a first main flow channel, a first auxiliary flow channel, a second auxiliary flow channel, and a second main flow channel, the first main flow channel and the first auxiliary flow channel being connected to each other to form an upper heat source cavity, and the second main flow channel and the second auxiliary flow channel being connected to each other to form a lower heat source cavity; the second auxiliary flow channel and the first main flow channel being adjacent to each other, and the second main flow channel and the first auxiliary flow channel being adjacent to each other along a stacking direction of the heat exchange medium flow channel; wherein the second booster pump is used to pressurize liquid or gas to a second pressure, the second pressure is lower than the first pressure;

in the upper heat source cavity, a flow area of the first main flow channel is larger than a flow area of the first auxiliary flow channel, and the first main flow channel and the first auxiliary flow channel intersect with each other, so that an intersection forms a first connection point that penetrates each other; and in the lower heat source cavity, a flow area of the second main flow channel is larger than a flow area of the second auxiliary flow channel, and the second main flow channel and the second auxiliary flow channel intersect with each other, so that an intersection forms a second connection point that penetrates each other.

2. The LNG gas supply system of claim 1, wherein in a projection of a top view direction, the second auxiliary flow channel is located within a projection range of the first main flow channel, and the second main flow channel is located within a projection range of the first auxiliary flow channel.

3. The LNG gas supply system of claim 2, wherein the first auxiliary flow channel is formed by combining two or more independent flow channels side by side; and each of the two or more independent flow channels is independently connected to the first main flow channel in the upper heat source cavity at the first connection point; and the second auxiliary flow channel is formed by combining two or more independent flow channels side by side; and each of the two or more independent flow channels is independently connected to the second main flow channel in the lower heat source cavity at the second connection point.

4. The LNG gas supply system of claim 3, wherein a bottom end of the first auxiliary flow channel and a top end of the second auxiliary flow channel intersect with each other along the stacking direction of the heat exchange medium flow channel, and a converging port connecting the upper heat source cavity and the lower heat source cavity is formed at the intersection.

5. The LNG gas supply system of claim 2, wherein two adjacent intersection points of the first main flow channel and the first auxiliary flow channel in the upper heat source cavity are two end points, and a section of the first auxiliary flow channel between the two end points forms a single flow channel segment, and a partition plate is arranged within the single flow channel segment; and the partition plate extends along a length direction of the single flow channel segment to divide a flow channel cavity of the single flow channel segment into at least two isolation cavities; and a distance exists between two ends of the partition plate and the two end points; and two adjacent intersection points of the second main flow channel and the second auxiliary flow channel in the lower heat source cavity are two end points, and a section of the second auxiliary flow channel between the two end points forms a single flow channel segment, and a partition plate is arranged within the single flow channel segment; and the partition plate extends along a length direction of the single flow channel segment to divide a flow channel cavity of the single flow channel segment into at least two isolation cavities; and a distance exists between two ends of the partition plate and the two end points.

6. The LNG gas supply system of claim 1, wherein outer shapes of the first main flow channel and the first auxiliary flow channel are V-shaped, W-shaped, or wavy, and openings of the first main flow channel and the first auxiliary flow channel that cooperate with each other are opposite to each other in the upper heat source cavity, so that the openings of the first main flow channel and the first auxiliary flow channel are combined to form a closed loop structure, and the first connection point is provided at a joining point of the closed loop structure; and outer shapes of the second main flow channel and the second auxiliary flow channel are V-shaped, W-shaped, or wavy, and openings of the second main flow channel and the second auxiliary flow channel that cooperate with each other are opposite to each other in the lower heat source cavity, so that the openings of the second main flow channel and the second auxiliary flow channel are combined to form a closed loop structure, and the second connection point is provided at a joining point of the closed loop structure.

7. The LNG gas supply system of claim 6, wherein when the outer shapes of the first main flow channel and the first auxiliary flow channel are the V-shaped or W-shaped, a turning point of the first main flow channel is an inflection point of the first main flow channel, and a turning point of the first auxiliary flow channel is an inflection point of the first auxiliary flow channel; or when the outer shapes of the first main flow channel and the first auxiliary flow channel are the wavy, a peak or a trough of the first main flow channel is an inflection point of the first main flow channel, and a peak or a trough of the first auxiliary flow channel is an inflection point of the first auxiliary flow channel; and a row of a flow channel unit is formed with the first main flow channel and the first auxiliary flow channel cooperating with each other in the upper heat source cavity, adjacent inflection points of a current row flow channel unit and adjacent row flow channels of the upper heat source cavity are connected to each other; and when the outer shapes of the second main flow channel and the second auxiliary flow channel are the V-shaped or W-shaped, a turning point of the second main flow channel is an inflection point of the second main flow channel, and a turning point of the second auxiliary flow channel is an inflection point of the second auxiliary flow channel; or when the outer shapes of the second main flow channel and the second auxiliary flow channel are the wavy, a peak or a trough of the second main flow channel is an inflection point of the second main flow channel, and a peak or a trough of the second auxiliary flow channel is an inflection point of the second auxiliary flow channel; and a row of a flow channel unit is formed with the second main flow channel and the second auxiliary flow channel cooperating with each other in the lower heat source cavity, adjacent inflection points of a current row flow channel unit and adjacent row flow channels of the lower heat source cavity are connected to each other.

8. The LNG gas supply system of claim 1, wherein the upper heat source cavity and the lower heat source cavity are formed by three heat exchange plates, the three heat exchange plates include a first heat exchange plate, a second heat exchange plate, and a third heat exchange plate;

the first main flow channel is etched on a lower surface of the first heat exchange plate, the first auxiliary flow channel is etched on an upper surface of the second heat exchange plate, the second auxiliary flow channel is etched on a lower surface of the second heat exchange plate, and the second main flow channel is etched on an upper surface of the third heat exchange plate; the first main flow channel and the first auxiliary flow channel are notched to each other at the first connection point to form the upper heat source cavity, and the second main flow channel and the second auxiliary flow channel are notched to each other at the second connection point to form the lower heat source cavity; the first main flow channel, the first auxiliary flow channel, the second auxiliary flow channel, and the second main flow channel all have a groove shape; and an upper heat exchange plate provided with the first LNG flow channel is arranged above the first heat exchange plate, and a lower heat exchange plate provided with the second LNG flow channel is arranged below the third heat exchange plate.

9. The LNG gas supply system of claim 1, wherein the upper heat source cavity and the lower heat source cavity are formed by three heat exchange plates, the three heat exchange plates include a first heat exchange plate, a second heat exchange plate, and a third heat exchange plate;

the first main flow channel is etched on a lower surface of the first heat exchange plate, the first auxiliary flow channel is etched on an upper surface of the second heat exchange plate, the second auxiliary flow channel is etched on a lower surface of the second heat exchange plate, and the second main flow channel is etched on an upper surface of the third heat exchange plate; the first main flow channel and the first auxiliary flow channel are notched to each other at the first connection point to form the upper heat source cavity, and the second main flow channel and the second auxiliary flow channel are notched to each other at the second connection point to form the lower heat source cavity; and the first main flow channel, the first auxiliary flow channel, the second auxiliary flow channel, and the second main flow channel all have a groove shape; and a side heat exchange plate is also arranged above or below the first heat exchange plate, and the side heat exchange plate is simultaneously provided with the first LNG flow channel and the second LNG flow channel that are independent of each other.

10. The LNG gas supply system of claim 9, wherein a range of angles formed between the first main flow channel and a length direction of the three heat exchange plates, the first auxiliary flow channel and the length direction of the three heat exchange plates, the second main flow channel and the length direction of the three heat exchange plates, or the second auxiliary flow channel and the length direction of the three heat exchange plates respectively is (0°, 15°].

11. The LNG gas supply system of claim 9, wherein the first main flow channel or the second main flow channel is a semicircular groove with a radius between 0.5 and 2 mm, or a rectangular groove with a width between 0.5 and 2 mm.

* * * * *